(12) United States Patent
Hibbard et al.

(10) Patent No.: US 9,537,905 B2
(45) Date of Patent: Jan. 3, 2017

(54) TRACING AND ASYNCHRONOUS COMMUNICATION NETWORK AND ROUTING METHOD

(71) Applicant: Contact Solutions, LLC, Reston, VA (US)

(72) Inventors: Michael Hibbard, Clear Brook, VA (US); James J. Dellostritto, Jordan, NY (US)

(73) Assignee: Contact Solutions, LLC, Reston, VA (US)

( * ) Notice: Subject to any disclaimer, the term of this patent is extended or adjusted under 35 U.S.C. 154(b) by 0 days.

(21) Appl. No.: 14/820,001

(22) Filed: Aug. 6, 2015

(65) Prior Publication Data

US 2016/0036869 A1 Feb. 4, 2016

(51) Int. Cl.
| | |
|---|---|
| *G06F 15/16* | (2006.01) |
| *H04L 29/06* | (2006.01) |
| *H04M 3/51* | (2006.01) |
| *H04M 3/22* | (2006.01) |
| *H04M 3/42* | (2006.01) |

(Continued)

(52) U.S. Cl.
CPC .......... *H04L 65/1083* (2013.01); *H04L 63/08* (2013.01); *H04L 65/80* (2013.01); *H04M 3/2218* (2013.01); *H04M 3/42221* (2013.01); *H04M 3/42263* (2013.01); *H04M 3/5141* (2013.01); *H04M 3/5175* (2013.01); *H04M 3/5191* (2013.01);

(Continued)

(58) Field of Classification Search
USPC ....... 709/203, 217, 219, 223, 224, 226, 228, 709/232; 235/380; 379/265.09, 265.13
See application file for complete search history.

(56) References Cited

U.S. PATENT DOCUMENTS

| | | |
|---|---|---|
| 4,797,925 A | 1/1989 | Lin |
| 5,493,608 A | 2/1996 | O'Sullivan |

(Continued)

FOREIGN PATENT DOCUMENTS

| | | |
|---|---|---|
| AU | 2001249276 A2 | 10/2001 |
| WO | WO 2007/086038 A1 | 8/2007 |

(Continued)

OTHER PUBLICATIONS

International Search Report and Written Opinion for PCT Application No. PCT/US2013/37779, mailed Jul. 5, 2013, 8 pages.

(Continued)

*Primary Examiner* — Quang N Nguyen

(57) ABSTRACT

A system and method for asynchronous conversation routing and tracing that allows a client and agent to connect and reconnect to one another over a discontinuous engagement. The system and method facilitate this by allowing multiple methods of communication between the client and agent, including live communications and out-of-band communications. All communications between a client and agent are tied to a client case accessible by the agent, and the client case can include context and environmental data to further assist the agent or to route a customer service call to an appropriate agent. At any time, the client or agent can send out-of-band messages to one another to advance the customer service process, or the client or agent can seek to re-establish live communication with each other. This provides the client with a consistent point of contact not easily supportable with phone based call centers where support is single-threaded.

19 Claims, 25 Drawing Sheets

US 9,537,905 B2
Page 2

(51) Int. Cl.
*H04M 3/53* (2006.01)
*H04M 7/00* (2006.01)

(52) U.S. Cl.
CPC ......... *H04M 3/5307* (2013.01); *H04M 7/0042* (2013.01); *H04M 2203/551* (2013.01)

(56) References Cited

U.S. PATENT DOCUMENTS

| | | |
|---|---|---|
| 5,553,121 A | 9/1996 | Martin et al. |
| 5,562,453 A | 10/1996 | Wen |
| 5,600,776 A | 2/1997 | Johnson et al. |
| 5,615,257 A | 3/1997 | Pezzullo et al. |
| 5,870,709 A | 2/1999 | Bernstein |
| 5,874,962 A | 2/1999 | de Judicibus et al. |
| 6,035,018 A | 3/2000 | Kaufman |
| 6,069,939 A | 5/2000 | Fung et al. |
| 6,146,147 A | 11/2000 | Wasowicz |
| 6,167,395 A | 12/2000 | Beck et al. |
| 6,226,364 B1 | 5/2001 | O'Neil |
| 6,401,075 B1 | 6/2002 | Mason et al. |
| 6,459,776 B1 | 10/2002 | Aktas et al. |
| 6,462,759 B1 | 10/2002 | Kurtzberg et al. |
| 6,487,277 B2 | 11/2002 | Beyda et al. |
| 6,496,692 B1 | 12/2002 | Shanahan |
| 6,856,333 B2 | 2/2005 | Ullmann et al. |
| 6,941,269 B1 | 9/2005 | Cohen et al. |
| 6,981,242 B2 | 12/2005 | Lehmeier et al. |
| 6,985,865 B1 | 1/2006 | Packingham et al. |
| 7,024,366 B1 | 4/2006 | Deyoe et al. |
| 7,039,168 B1 | 5/2006 | Potts |
| 7,065,188 B1 | 6/2006 | Mei et al. |
| 7,089,592 B2 | 8/2006 | Adjaoute |
| 7,143,029 B2 | 11/2006 | Elshafei |
| 7,146,419 B1 | 12/2006 | O'Rourke et al. |
| 7,194,409 B2 | 3/2007 | Balentine et al. |
| 7,221,933 B2 | 5/2007 | Sauer et al. |
| 7,224,790 B1 | 5/2007 | Bushey et al. |
| 7,325,037 B2 | 1/2008 | Lawson |
| 7,376,710 B1 | 5/2008 | Cromwell et al. |
| 7,385,997 B2 | 6/2008 | Gorti et al. |
| 7,415,100 B2 | 8/2008 | Cooper et al. |
| 7,447,662 B2 | 11/2008 | Gibson |
| 7,457,395 B2 | 11/2008 | Creamer et al. |
| 7,498,860 B2 | 3/2009 | Bhattacharya et al. |
| 7,515,695 B1 | 4/2009 | Chan et al. |
| 7,519,049 B2 | 4/2009 | Masuda |
| 7,525,970 B2 | 4/2009 | Mangin et al. |
| 7,573,986 B2 | 8/2009 | Balentine et al. |
| 7,610,040 B2 | 10/2009 | Cantini et al. |
| 7,620,894 B1 | 11/2009 | Kahn |
| 7,653,543 B1 | 1/2010 | Blair et al. |
| 7,665,024 B1 | 2/2010 | Kondziela |
| 7,665,140 B2 | 2/2010 | Oliver et al. |
| 7,680,035 B2 | 3/2010 | Krishnan |
| 7,729,915 B2 | 6/2010 | Balentine et al. |
| 7,787,543 B2 | 8/2010 | Yamaguchi |
| 7,801,284 B1 | 9/2010 | Chakra et al. |
| 7,808,918 B2 | 10/2010 | Bugenhagen |
| 7,809,569 B2 | 10/2010 | Attwater et al. |
| 7,817,784 B2 | 10/2010 | Wang et al. |
| 7,836,409 B2 | 11/2010 | Denoue et al. |
| 7,865,841 B2 | 1/2011 | Morikawa |
| 7,903,792 B2 | 3/2011 | Balentine et al. |
| 7,904,387 B2 | 3/2011 | Geering |
| 7,920,682 B2 | 4/2011 | Byrne et al. |
| 7,970,615 B2 | 6/2011 | Attwater et al. |
| 8,000,689 B2 | 8/2011 | Featherstone et al. |
| 8,027,255 B2 | 9/2011 | Kahn et al. |
| 8,046,420 B2 | 10/2011 | Pan |
| 8,068,609 B2 | 11/2011 | Puranik et al. |
| 8,090,867 B2 | 1/2012 | Katis et al. |
| 8,094,788 B1 | 1/2012 | Eberle et al. |
| 8,096,657 B2 | 1/2012 | Pompilio et al. |
| 8,107,999 B2 | 1/2012 | Pandruvada |
| 8,108,509 B2 | 1/2012 | Chatani |
| 8,131,553 B2 | 3/2012 | Attwater et al. |
| 8,131,615 B2 | 3/2012 | Diev et al. |
| 8,145,562 B2 | 3/2012 | Wasserblat et al. |
| 8,155,948 B2 | 4/2012 | Ruano et al. |
| 8,171,123 B2 | 5/2012 | Takeda et al. |
| 8,190,554 B2 | 5/2012 | Chen et al. |
| 8,213,579 B2 | 7/2012 | Balentine et al. |
| 8,223,945 B2 | 7/2012 | Drovdahl et al. |
| 8,233,613 B1 | 7/2012 | Michaelis et al. |
| 8,254,552 B2 | 8/2012 | Harton et al. |
| 8,280,833 B2 | 10/2012 | Miltonberger |
| 8,353,452 B2 * | 1/2013 | Sharpe ............... G06Q 30/0601 235/380 |
| 8,370,520 B2 | 2/2013 | Kohli et al. |
| 8,379,830 B1 | 2/2013 | Naik et al. |
| 8,400,491 B1 | 3/2013 | Panpaliya et al. |
| 8,458,090 B1 | 6/2013 | Batra et al. |
| 8,489,399 B2 | 7/2013 | Gross |
| 8,495,244 B2 | 7/2013 | Bonar et al. |
| 8,595,218 B2 | 11/2013 | Bell et al. |
| 8,619,602 B2 | 12/2013 | Begen |
| 8,635,345 B2 | 1/2014 | Brown et al. |
| 8,781,103 B2 * | 7/2014 | Baranovsky ............ H04M 3/51 379/265.09 |
| 8,880,631 B2 | 11/2014 | Logan et al. |
| 8,976,955 B2 * | 3/2015 | Liberman Ben-Ami ............ H04M 3/5191 709/224 |
| 9,166,881 B1 | 10/2015 | Gray et al. |
| 9,172,690 B2 | 10/2015 | Logan et al. |
| 9,218,410 B2 | 12/2015 | Gray et al. |
| 2002/0080938 A1 | 6/2002 | Alexander et al. |
| 2002/0090062 A1 | 7/2002 | Mohamed Alhadad et al. |
| 2002/0116466 A1 | 8/2002 | Trevithick et al. |
| 2002/0124258 A1 | 9/2002 | Fritsch |
| 2003/0031185 A1 | 2/2003 | Kikuchi et al. |
| 2003/0064716 A1 | 4/2003 | Gailey et al. |
| 2003/0191639 A1 | 10/2003 | Mazza |
| 2004/0045036 A1 | 3/2004 | Terasaki |
| 2004/0258223 A1 | 12/2004 | Rahamim |
| 2005/0047556 A1 | 3/2005 | Somerville et al. |
| 2005/0058149 A1 | 3/2005 | Howe |
| 2005/0100022 A1 | 5/2005 | Ramprashad |
| 2006/0034287 A1 | 2/2006 | Novack et al. |
| 2006/0036442 A1 | 2/2006 | Novack et al. |
| 2006/0126803 A1 | 6/2006 | Patel et al. |
| 2006/0165104 A1 | 7/2006 | Kaye |
| 2006/0245357 A1 | 11/2006 | Ilan |
| 2006/0271367 A1 | 11/2006 | Hirabayashi et al. |
| 2007/0036323 A1 | 2/2007 | Travis |
| 2007/0038705 A1 | 2/2007 | Chickering et al. |
| 2007/0053346 A1 | 3/2007 | Bettis et al. |
| 2007/0119923 A1 | 5/2007 | Garrison et al. |
| 2007/0250318 A1 | 10/2007 | Waserblat et al. |
| 2008/0004881 A1 | 1/2008 | Attwater et al. |
| 2008/0101563 A1 | 5/2008 | Smith |
| 2008/0103761 A1 | 5/2008 | Printz |
| 2008/0123627 A1 | 5/2008 | Moreman et al. |
| 2008/0216172 A1 | 9/2008 | Forman et al. |
| 2009/0041216 A1 | 2/2009 | Balk et al. |
| 2009/0327422 A1 | 12/2009 | Katis et al. |
| 2010/0002692 A1 | 1/2010 | Bims |
| 2010/0121974 A1 | 5/2010 | Einarsson et al. |
| 2010/0166158 A1 | 7/2010 | Costello et al. |
| 2010/0293090 A1 | 11/2010 | Domenikos et al. |
| 2010/0310059 A1 | 12/2010 | Davis et al. |
| 2011/0159854 A1 | 6/2011 | Kedefors et al. |
| 2011/0164744 A1 | 7/2011 | Olshansky et al. |
| 2011/0282778 A1 | 11/2011 | Wright et al. |
| 2012/0209630 A1 | 8/2012 | Ihm et al. |
| 2012/0253805 A1 | 10/2012 | Rajakumar et al. |
| 2012/0310652 A1 | 12/2012 | O'Sullivan |
| 2013/0018795 A1 | 1/2013 | Kolhatkar et al. |
| 2013/0058248 A1 | 3/2013 | Singh et al. |
| 2013/0069858 A1 | 3/2013 | O'Sullivan |
| 2013/0070910 A1 | 3/2013 | O'Sullivan |
| 2013/0070911 A1 | 3/2013 | O'Sullivan |
| 2013/0079055 A1 | 3/2013 | Jouin |
| 2013/0177144 A1 | 7/2013 | Forsee et al. |

(56) References Cited

U.S. PATENT DOCUMENTS

| | | |
|---|---|---|
| 2013/0183979 A1 | 7/2013 | Chen et al. |
| 2013/0185802 A1 | 7/2013 | Tibeica et al. |
| 2013/0204755 A1 | 8/2013 | Zoldi et al. |
| 2013/0263167 A1 | 10/2013 | Parthasarathy et al. |
| 2013/0282844 A1 | 10/2013 | Logan et al. |
| 2013/0317993 A1 | 11/2013 | Wasserman et al. |
| 2013/0332620 A1 | 12/2013 | Gahm et al. |
| 2014/0045456 A1 | 2/2014 | Ballai et al. |
| 2014/0137200 A1 | 5/2014 | Logan et al. |
| 2014/0140213 A1 | 5/2014 | Raleigh et al. |
| 2014/0237061 A1 | 8/2014 | Logan et al. |
| 2015/0220619 A1 | 8/2015 | Gray et al. |
| 2015/0350443 A1* | 12/2015 | Kumar ............... H04M 3/5232 379/265.13 |

FOREIGN PATENT DOCUMENTS

| | | |
|---|---|---|
| WO | WO 2013/057315 A2 | 4/2013 |
| WO | WO 2013/163169 A1 | 10/2013 |

OTHER PUBLICATIONS

Office Action issued in U.S. Appl. No. 13/795,868, mailed on Nov. 18, 2014.

Office Action issued in U.S. Appl. No. 14/157,691, mailed on Jan. 22, 2015.

Final Office Action issued in U.S. Appl. No. 14/157,691, mailed on Jun. 12, 2015, 7 pages.

Balentine, B., "It's Better to Be a Good Machine Than a Bad Person: Speech Recognition and Other exotic User Interfaces at the Twilight of the Jetsonian Age," ICMI Press, Feb. 1, 2007, 447 pages.

Extended European Search Report dated Sep. 11, 2015 for European Application No. 13781438.0-1851.

[Author Unknown] "Optimizing Adaptive Server Anywhere Performance Over a WAN." iAnywhere Solutions, Inc., a subsidiary of Sybase, Inc., 2013.

T.F. Abdelzaher and N. Bhatti, "Web Server QoS Management by Adaptive Content Delivery." Internet Systems and Applications Laboratory, Hewlett Packard Laboratories, Palo Alto, HPL-1999-161, 1999.

M. Stemm and R. Katz, "A Network Measurement Architecture for Adaptive Applications." INFOCOM, Nineteenth Annual Joint Conference of the IEEE Computer and Communications Societies, Proceedings, IEEE, 1:285-294, 2000.

W. Wei et al., "Effective Detection of Sophisticated Online Banking Fraud on Extremely Imbalanced Data." World Wide Web, Internet and Web Information Systems, 16(4):449-475, 2013.

D. Zhang, "Delivery of Personalized and Adaptive Content to Mobile Devices: A Framework and Enabling Technology." Communications of the Association for Information Systems, 12(13):183-202, 2003.

\* cited by examiner

AGENT DESKTOP

| ALL 89 | NEW 1 | WAITING 88 | | |
|---|---|---|---|---|
| CUSTOMER | TICKET # | SUBJECT | STATUS | LAST UPDATED |
| AARON ENDED | 100079711 | CHAT WITH AN AGENT | NEW | 9 MINUTES |
| MELISSAT ENDED | 100068651 | ISSUE WITH CC | WAITING | 1997 HOURS 30 MINUTES |
| MELISSAT AWAY | 100068641 | ISSUE WITH MISSING PAYMENT | WAITING | 2024 HOURS 39 MINUTES |
| JASON AWAY | 100058061 | TEST TEXT | WAITING | 2065 HOURS 6 MINUTES |
| JASON AWAY | 100067151 | CHAT WITH AN AGENT | WAITING | 2139 HOURS 59 MINUTES |
| JASON AWAY | 700067161 | CHAT WITH AN AGENT | WAITING | 2139 HOURS 59 MINUTES |
| AARON OFFLINE | 100067171 | CHAT WITH AN AGENT | WAITING | 2175 HOURS 47 MINUTES |
| MM AWAY | 100087091 | CHAT WITH AN AGENT | WAITING | 2177 HOURS 10 MINUTES |

TRACING AND ASYNCHRONOUS COMMUNICATION NETWORK AND ROUTING METHOD

CROSS-REFERENCE TO RELATED APPLICATIONS

This application is related to U.S. patent application Ser. No. 14/157,691, now issued as U.S. Pat. No. 9,172,690, entitled "Apparatus and Methods for Multi-Mode Asynchronous Communication," filed Jan. 17, 2014, which is a continuation of U.S. patent application Ser. No. 13/795,868, now abandoned, entitled "Apparatus and Methods for Multi-Mode Asynchronous Communication," filed Mar. 12, 2013, which claims priority to and the benefit of U.S. Provisional Patent Application Ser. No. 61/636,923, entitled "Methods of Multi-Mode Asynchronous Communication," filed on Apr. 23, 2012, each of which is incorporated herein by reference in its entirety.

BACKGROUND

Embodiments described herein relate generally to voice and data communications and more particularly to apparatus and methods for multi-mode asynchronous communication routing (ACR) and tracing.

In today's society, advances in technology allow individuals to use multiple modes of communication from a home or office and while on the go. Individuals can communicate using voice, text messaging, instant message, e-mail, or the like. Accordingly, infrastructure exists to support these modes of communication; yet, the infrastructure is often designed to support an uninterrupted conversation through a single mode of communication. Thus, it is difficult to have a unified multi-mode communication that spans a series of interactions that might be required to complete a transaction.

In addition, the advances in technology have enabled some individuals to perform multiple tasks simultaneously. As a result, a cultural shift has begun toward a more fast paced, efficient, and client controlled customer self-service. However, many enterprises offer a customer service system that is unreliable, synchronous, and/or not sufficiently customer friendly. For example, in some instances an individual may be interrupted while in the progress of interacting with a customer support organization or system (e.g., an interactive voice response (IVR) system), or by other obligations, thereby negating the value of at least a portion of the progress made. Furthermore, most customer service systems require a single mode of communication be used to fully complete a specific task.

In traditional customer service, a client calls in and is routed to an agent based on a series of questions, often repeating those questions. In some cases, the client has to remember or write down the case number so that the agent can look it up. In many cases, a call is ended and then resumed at a later time when the client calls back in to customer service. The problem is the unlikeliness of returning clients to have access to the originating agent. In this situation, when resuming a case or help ticket, the client connects to a new agent that has to look up the case, repeat the questions to the client, and learn the specifics of the case. This is frustrating for the client as they have to repeat the problem they are having. This can also be costly for the call center due to the new agent having to spend extra time repeating questions and becoming familiar with the case in order to pick up where the first agent left off. Phone-based support such as this is single threaded, limiting the ability for clients and agents to maintain congruency through the lifecycle of engagement.

Thus, a need exists for improved methods and systems of multi-mode asynchronous communication having asynchronous conversation routing and tracing.

SUMMARY

The ACR intends to eliminate these problems through smart management of what are called agent work lists and via a tracing mechanism that tracks the client's interactions from the point they enter the platform until they leave the platform, whether due to agent resolution, expiration, or client or agent cancellation of the case. The ACR and work list facilitate a multi-threaded model for agent resolution of client cases. Furthermore, the ACR and work list facilitate multitasking by an agent. Utilizing chat, an agent can often carry on more than one conversation at a time. This is advantageous, however, it also dictates the necessity to manage workflow across multiple engagements and across discontinuous messaging events.

When the client opens up the platform, tracing and conversation services begin recording all transactions and messages. If the client requests live agent support, then the client is assigned to an agent or, in some embodiments, can select an agent. After getting paired with an agent, the client and agent can converse in live chat, and then go about their business until the agent has new information, has a request for further information, or has a resolution for the client. Likewise, the client can re-engage the agent at any time if they have new information, have come up with a resolution on their own, or are looking for updates. The ACR has been designed to support a concierge-like work flow between an agent and a client. Constant live communication is not required during the resolution of a case. The lifecycle for engagement assumes that the client and agent relationship remains consistent (e.g. same agent throughout the engagement lifecycle), however this is not always realistic so the ACR also supports active automated transfers in the event that the agent has the maximum number of live engagements and the client is not willing to wait for re-engagement.

After the client has had an initial chat with the agent and the case has been initialized, the client is free to resume life while the agent handles the case for the client. Depending on the complexity of the case, the agent and client may reconnect in a live chat channel several more times or not at all. The client and agent may also exchange out-of-band information or messages. Out-of-band messages refer to the asynchronous messages sent by a client or agent when the client and agent are not connected and in a live chat channel. Essential to reconnection requests and out-of-band messages is the agent work list, which tracks the case ownership between the client and agent through discontinuous cycles of engagement. The key benefit supported by this process is a consistent point of contact for the client which is not easily supportable with phone based call centers where support is single-threaded. The likelihood that returning clients will get the same agent in a phone based call center is very slim.

BRIEF DESCRIPTION OF THE DRAWINGS

FIGS. 19-24 are various screen shots of a work list dashboard, according to an embodiment.

DETAILED DESCRIPTION OF THE DISCLOSURE

As used in this specification, the term "communication mode" generally refers to a method of communication between a first electronic device and a second electronic device. For example, a communication mode can be one of e-mail, text messages (e.g., short message service (SMS) messages), instant messages, optical pattern transmissions (e.g., a high capacity color barcode, a QR code, a two-dimensional barcode, a one-dimensional barcode, a black light pattern, etc.), RF pattern transmissions, a mobile device application, a website, a personal computer (PC) application, an interactive advertisement (e.g., a Flash advertisement on a website), an interactive television (ITV) application (e.g., client uses their TV remote to select and/or enter process ID), TCP/IP transmissions, interactive voice response (e.g., via touch tones and/or voice recognition), and the like. Furthermore, the presented examples of communication modes are not an exhaustive list of suitable communication modes. Thus, the embodiments described herein are not limited to the use of the aforementioned communication modes and can use any suitable communication mode.

As used in this specification, the term "asynchronous" generally refers to events occurring at different time periods. In addition, asynchronous communication, as described herein, relates to sending, receiving, and/or accessing a first set of data at a first time period and sending, receiving, and/or accessing subsequent sets of data at later time periods, independent of the previous time periods.

As used herein, the term "customer service" generally refers to a good or service provided to a customer. For example, customer service can refer to processing reservations, shopping (e.g., online grocery shopping, retail shopping, etc.), and/or the like. Furthermore, customer service can refer to a support function (e.g., technical support, sales support, and/or the like). As used herein, customer service systems can employ live persons, interactive voice recognition, online interface (e.g., webpage), and/or the like.

Figure 1:
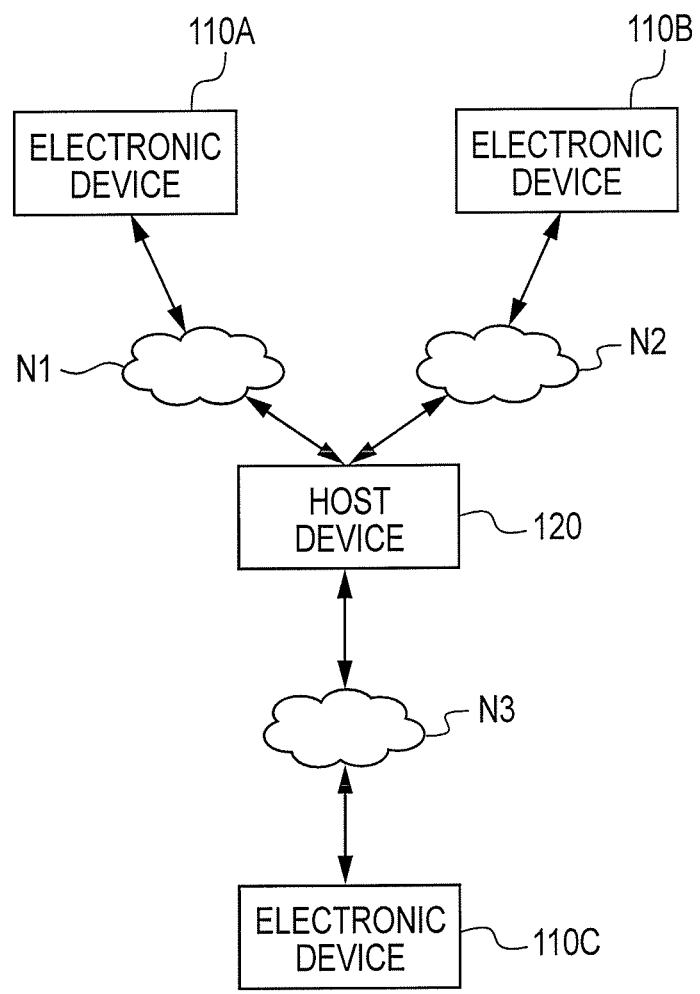
FIG. 1 is a schematic illustration of a system and network communication according to an embodiment.

As shown in FIG. 1, the host device 120 can be in communication with an electronic device 11 OA via a first network N1, an electronic device 110B via a second network N2, and an electronic device 110C via a third network N3. In some instances, the electronic devices 110A, 110B, and 110C can be associated with a first client, a second client, and a third client, respectively. In such instances, the host device 120 can communicate with the electronic devices 110A, 110B, and 110C substantially simultaneously. Furthermore, the first network N1, the second network N2, and/or the third network N3 can be similar networks or different networks. For example, in some instances, the electronic devices 110A, 110B, and 110C, can communicate with the host device 120 via a public switched network (PSTN). In other instances, the electronic devices 110A, 110B, and 110C can communicate with the host device 120 via a first communication mode, a second communication mode, and a third communication mode, respectively, wherein each communication mode is different from the other communication modes.

In some instances, the electronic devices 110A, 110B, and 110C can be associated with a single client. In such instances, the host device 120 can asynchronously communicate with the electronic device 110A, the electronic device 110B, or the electronic device 110C. For example, in some embodiments, a client can manipulate the electronic device 110A (e.g., a home PC) to communicate with the host device via a first network N1 and during a first time period. The first network N1 can be configured to facilitate (e.g., provide infrastructure to support) a first communication mode (e.g., via an internet service provider (ISP) and the internet).

The client can discontinue the communication between the electronic device 110A and the host device 120 and manipulate the electronic device 110B (e.g., a mobile device such as a smart phone) to communicate with the host device 120 via a second network N2 and during a second time period, after the first time period. With the electronic device 110B associated with the client, the host device 120 can continue the communication (e.g., a customer service process such as, for example, booking a flight) from the point at which the communication ended with the electronic device 110A. In some instances, the electronic device 110B can communicate with the host device 120 via the first communication mode (e.g., the second network N2 is the same as the first network N1). In other instances, the electronic device 110B can communicate with the host device 120 via a second communication mode (e.g., SMS), different from the first communication mode.

In a similar manner, the client can discontinue the communication between the electronic device 110B and the host device 120 and manipulate the electronic device 110C (e.g., a work computer) to communicate with the host device 120 via a third network N3 and during a third time period, after the second time period. With the electronic device 110C associated with the client, the host device 120 can continue the communication (e.g., a customer service process such as, for example, booking a flight) from the point at which the communication ended with the electronic device 110B. In some embodiments, the electronic device 110C can communicate with the host device 120 via the first communication mode (e.g., via an ISP and the internet) or the second communication mode (e.g., SMS). In other embodiments, the electronic device 110C can communicate with the host device 120 via a third communication mode (e.g., e-mail), different from the first communication mode and/or the second communication mode. In this manner, the client can asynchronously manipulate the electronic devices 110A, 110B, and 110C, to communicate with the host device 120 using any suitable communication mode to, for example, book an airline flight. Furthermore, as described above, the host device 120 can store an identifier associated with, for example, the process steps of the customer service process. In this manner, the customer service process is a linear process (e.g., the progress made during the first time period is stored and accessed during the second time period and the progress made during the second time is stored and accessed during the third time period).

Figure 2:
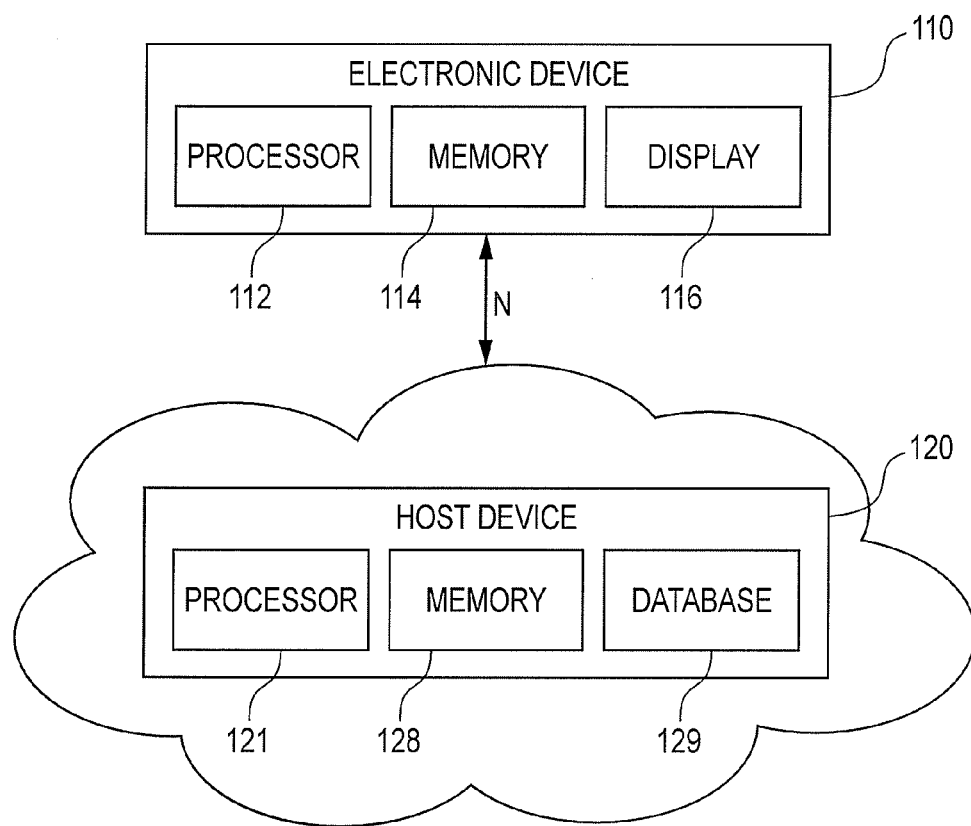
FIG. 2 is a schematic illustration of communication between an electronic device and a host device, according to an embodiment.

FIG. 2 is a schematic illustration of an electronic device 110 in communication with a host device 120 via a network N, according to an embodiment. The electronic device 110 can be, for example, a personal computer (PC), a personal digital assistant (PDA), a smart phone, a video game console and/or the like. Furthermore, an agent can use an electronic device, for example a PC, PDA, smart phone, video game console, and/or the like, to connect to the host 120 and the client's electronic device through the network. The host device 120 can be any suitable host device (e.g., a web server, a network management device, and/or the like). The network N can be any type of network (e.g., a PSTN, a local area network (LAN), a wide area network (WAN), a virtual network, a cellular network, and/or the internet) implemented as a wired network and/or a wireless network. As described in further detail herein, in some embodiments, the electronic device 110 can be a personal computer connected to the host device 120 via an ISP and the Internet (e.g., network N).

In some embodiments, the electronic device 110 (also referred to herein as "client device") can communicate with the host device 120 and the network N via intermediate networks and/or alternate networks. Such intermediate networks and/or alternate networks can be of a same type and/or a different type of network as the network N. As such, in some embodiments, the electronic device 110 can send data to and/or receive data from the host device 120 using multiple communication modes (defined above) that may or may not be transmitted to the host device 120 using a common network. For example, the electronic device 110 can be a mobile telephone (e.g., smart phone) connected to the host device 120 via a cellular network and the Internet (e.g., network N).

The electronic device 110 includes at least a processor 112, a memory 114, and a display 116. The memory 114 can be, for example, a random access memory (RAM), a memory buffer, a hard drive, a read-only memory (ROM), an erasable programmable read-only memory (EPROM), an electronically erasable programmable read-only memory (EEPROM), or any other suitable electronic storage medium. In some embodiments, the memory 114 of the electronic device 110 stores instructions to cause the processor 112 to execute modules, processes, and/or functions associated with using a personal computer application, mobile application, an internet web browser, and/or the like. Furthermore, the memory 114 stores instructions to cause the processor 112 to send signal information to the display 116.

The processor 112 of the client device 110 can be any suitable processing device configured to run and/or execute a set of instructions or code. For example, the processor can be a general purpose processor, a central processing unit (CPU), an accelerated processing unit (APU), and/or the like. The processor 112 can be configured to run and/or execute a set of instructions or code stored in the memory 114 associated with using a personal computer application, a mobile application, an internet web browser, telephonic or cellular communication, and/or the like. More specifically, in some instances, the processor 112 can execute a set of instructions or code stored in the memory 114 associated with an asynchronous communication with, for example, the host device 120.

The display 116 (FIG. 2) of the client device 110 can be any suitable display configured to provide a user interface to the client device 110. For example, the display 116 can be a cathode ray tube (CRT) monitor, a liquid crystal display (LCD) monitor, a light emitting diode (LED) monitor, and/or the like. The display 116 can be configured to provide the user interface for a personal computer application, mobile application, internet web browser, and/or the like. In such embodiments, the display 116 can be configured to graphically represent any suitable portion of a customer service system and/or process (e.g., a webpage, contact information, an instant message interface, an e-mail interface, and/or the like). In some embodiments, the display 116 can be and/or include a touch screen.

While not shown in FIG. 2, in some embodiments, the electronic device 110 can include one or more network interface devices (e.g., a network interface card) configured to connect the electronic device 110 to the network N. For example, the network interface device can include a Wifi and/or cellular transceiver.

The host device 120 can be any type of device configured to send and/or receive data over the network N from one or more client device 110. In some embodiments, the host device 120 can be configured to function as, for example, a server device (e.g., a web server device), a network management device, and/or so forth. The host device 120 includes at least a processor 121, a memory 128, and a database 129. The memory 128 can be, for example, a RAM, a memory buffer, a hard drive, a database, an EPROM, an EEPROM, a ROM, or any other suitable electronic storage medium. In some instances, the memory 128 of the host device 120 includes a set of instructions used to perform a user-defined task. In such instances, for example, the host device 120 is configured to communicate with multiple electronic devices using one or more suitable communication modes. In some instances, the memory 128 stores instructions to cause the processor 121 to execute modules, processes and/or functions associated with a customer service. For example, processor 121 can be configured to execute modules, services, and processes associated with an asynchronous conversation routing platform 138.

The processor 121 of the host device 120 can be any suitable processor such as, for example, a general purpose processor, a CPU, an APU, a network processor, a front end processor, and/or the like. Thus, the processor 121 can perform a set of instructions stored in the memory 128. For example, the processor 121 can be configured to update the database 129 with client information received from an electronic device (e.g., the electronic device 110) via one or more communication modes, as further described herein.

The database 129 of the host device 120 can be any suitable database such as, for example, a relational database, an object database, an object-relational database, a hierarchical database, a network database, an entity-relationship database, and/or the like. In some embodiments, the database 129 can be stored in, for example, the memory 128. While shown in FIG. 2 as being included in the host device 120, in other embodiments the database 129 can be operably coupled to the host device 120. For example, the host device 120 can be in communication with the database 129 over any suitable network (e.g., the network N). In such embodiments, the database 129 can be included in or stored by a network attached storage device (NAS). In such embodiments, the NAS and/or the database 129 can communicate with the host device 120 over any suitable network can be any suitable network (e.g., network N).

The database 129 can store and/or maintain data associated with client information (e.g., client preferences, client communications, client status, client requests, and/or the like). More specifically, and as described in further detail herein, the database 129 stores and/or maintains a relationship between a client identifier and various methods of identifying that client. For example, the database 129 can store a relationship between a client identifier and that client's e-mail address, telephone number, login name, instant message identifier, a communication device identifier (e.g., a mobile phone identifier, an internet protocol (IP) address, a media access control (MAC) address, etc.), and/or the like. Accordingly, if the host device 120 receives a text message and/or a voice message from a telephone number, the host device 120 can query and/or search the database 129, using the telephone number, for the client identifier with which that telephone number is associated. Similarly, if the host device 120 receives an e-mail message from an e-mail address or instant text message from a client having a text message identifier, the host device 120 can query and/or search the database 129, using the e-mail address or the text message identifier, respectively, for the client identifier with which that e-mail address or text message identifier is associated. Thus, the host device 120 can correlate information and/or data received from a client via multiple communication modes with a single client account associated with that client.

In addition, the database 129 can store an identifier (e.g., a status identifier) associated with any step in a customer service process. For example, in some instances, the host device 120 can be in communication with the electronic device 110 to provide a client a customer service associated with booking an airline flight. In such instances, the host device 120 can store, in the database 129, an identifier associated with the completion of a process step (e.g., login, flight request, travel dates, flight confirmation, and/or the like). Thus, if the customer service process is interrupted at a process step (e.g., the client ends the communication between the electronic device 110 and the host device 120), the host device 120 can be configured to resume the customer service at the process step when the host device 120 is again placed in communication with the electronic device 110. Similarly stated, the database 129 can store any suitable client information such that the host device 120 can provide an asynchronous customer service, as further described herein.

Figure 3:
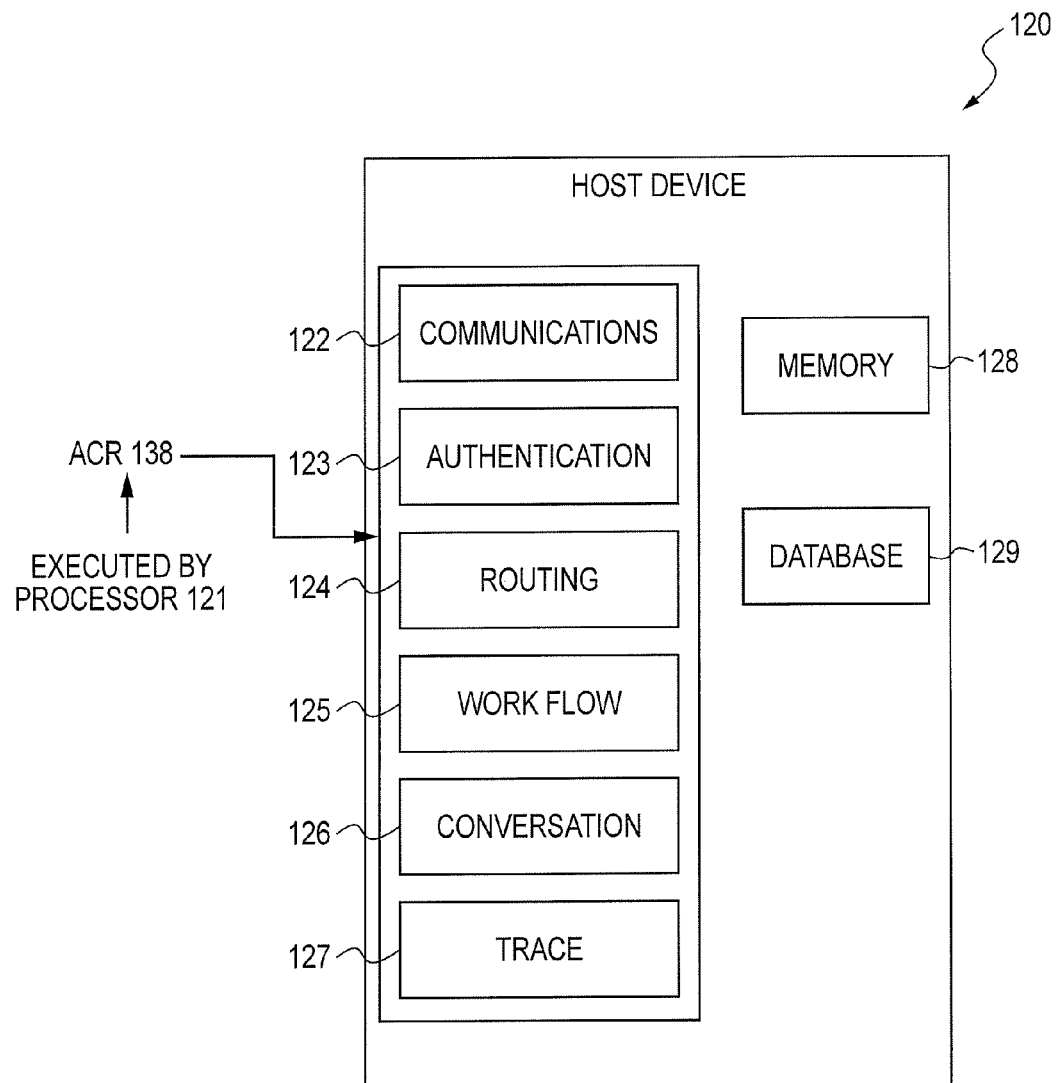
FIG. 3 is a schematic illustration of the host device illustrated in FIGS. 1 and 2.

FIG. 3 illustrates an example embodiment of the host device 120. As described above, the processor 121 of the host device 120 can be configured to execute specific services. The services can be, for example, hardware modules which can, for example, comprise dedicated processes that are designed to execute dedicated tasks, or software modules stored in the memory 128 and executed in the processor 121, and/or any combination thereof. For example, as shown in FIG. 3, the processor 121 includes and/or executes an asynchronous conversation routing platform 138 that includes a communication service 122, an authentication service 123, a routing service 124, a work flow service 125, a conversation service 126, and a trace service 127. The communication service 122 includes, for example, a set of instructions executed by the processor 121 associated with a network N and more specifically the electronic device 110 (FIG. 1). As described above, the network N can be any network such as, for example, a PSTN, a LAN, a WAN, a virtual network, a cellular network, and/or the internet. In the exemplified embodiment shown in FIG. 4, the communication service 122 can include a communication API 150, and modules associated with different modes of communication, including, for example, modules for chat 151, e-mail 152, SMS 153, and out-of-band messaging 154. The communication service can further include modules associated with any other mode of communication.

The authentication service 123 can be configured to query a database (e.g., the database 129) for a client identifier and/or account number. In some embodiments, the authentication service 123 can query the database 129 using a telephone number, an e-mail address, an instant message identifier, a social network account username and/or password, a private third party authentication identifier (e.g., client logs in with the third party), and/or any other communication identifier (e.g., a mobile phone identifier, a MAC address, etc.). For example, if the communication service 122 receives an SMS message from a mobile device, the authentication service 123 can query the database 129 to determine which client and/or account that telephone number is associated. Similarly, if the communication service 122 receives an e-mail from an e-mail address or an instant message from an instant messaging account having an instant message username, the authentication service 123 can query the database 129 to determine with which client and/or account the e-mail address or instant message username is associated. In some instances, the communication service 122 can receive a communication identifier and password combination. In such instances, the authentication service 123 can query the database to determine if the password is associated with the communication identifier, thereby authenticating the presence of an authorized client associated with an electronic device. In the example embodiment shown in FIG. 4, the processes of the authentication service 123 described above can be executed by an authentication module 155, a client (user) module 156, and a session module 157. An authentication service API 158 can also be provided. In an example embodiment of the session module 157, the session module can execute instructions associated with determining what session a client identifier, conversation identifier, and/or trace identifier is associated.

Figure 4:
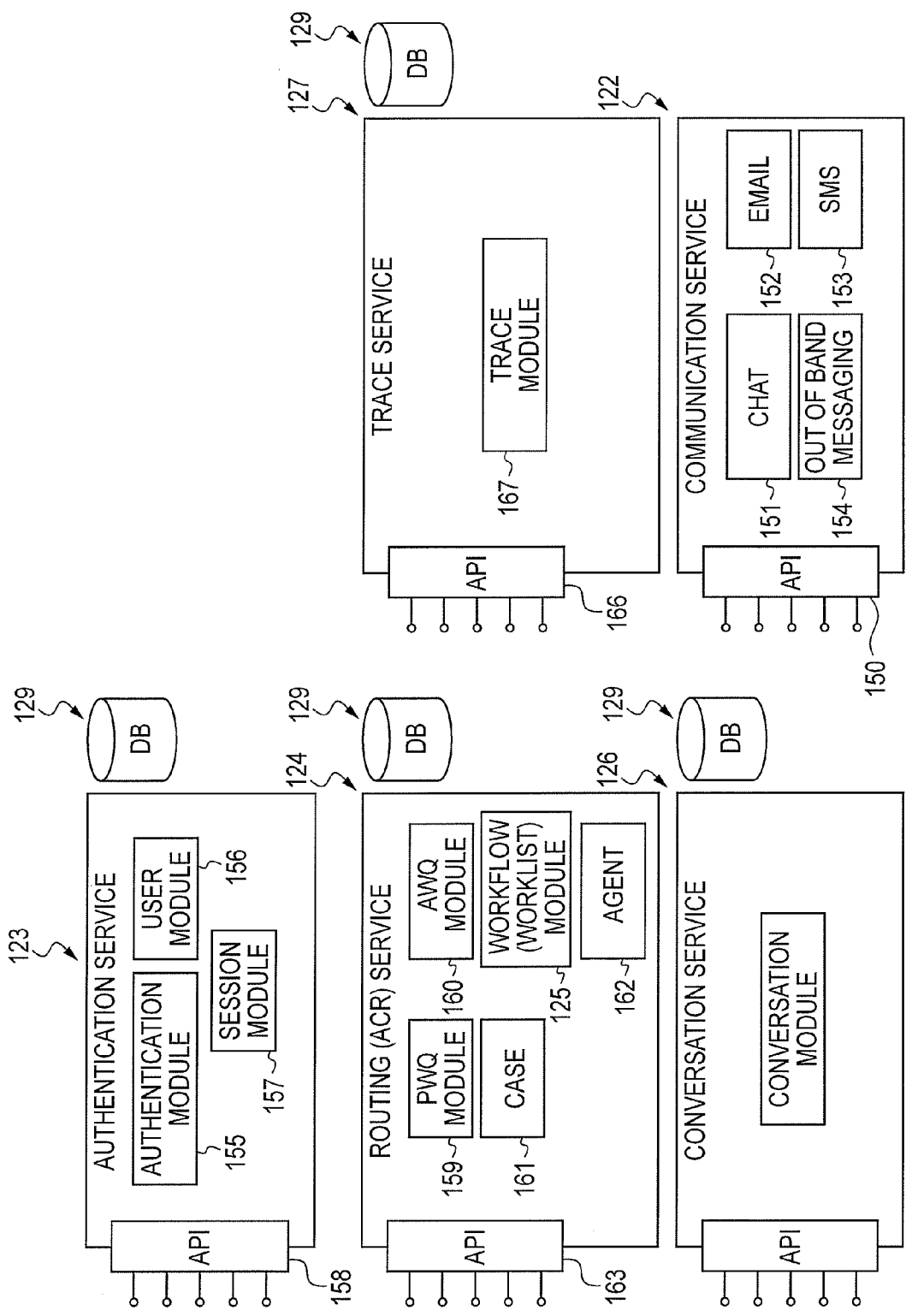
FIG. 4 is a schematic illustration of the services executed by the host device of FIG. 3, according to an embodiment.

The routing service 124 includes a set of instructions executed by the processor 121 associated with routing a client to an appropriate agent. As shown in the embodiment of FIG. 4, the set of instructions can contain multiple modules configured to be executed by the routing service 124, including a pending work queue module 159, agent work queue module 160, workflow (work list) module 125, case generation module 161, and agent module 162. The routing service 124 can further include a routing API 163. For example, the routing service 124 can include instructions associated with querying data collected by the conversation service and trace service, utilizing that data to match the client with an agent having the appropriate qualifications, for example an agent's qualifications can include customer service department experience or specific expertise in handling a type of case.

The work flow module 125 includes a set of instructions executed by the processor 121 associated with work flow management. In one embodiment, the work flow module 125 can be separate from the routing service 124, as in FIG. 3. In another embodiment, the work flow module 125 can be a module in the routing service 124, as in FIG. 5. The work flow module 125 can include instructions to cause the processor 121 to store in the database 129 a status identifier associated with any step in a customer service process. Furthermore, the work flow module 125 can maintain at least an agent's work list, live chat queue, live chat channels, and any other work flow management lists, queues, and processes, which will be described in more detail later.

The conversation service 126 includes a set of instructions executed by the processor 121 associated with storing and grouping all client/agent communications. For example, in some instances, a client associated with a communication mode and/or an electronic device can communicate with the host device 120 via a communication mode and/or an electronic device not associated the client. In such instances, the conversation service 126 can receive a signal associated with an authorization to update the database 129 and, thereby, associate the client with the communication mode and/or the electronic device and store the message or information sent. In this manner, the host device 120 can associate any suitable number of electronic devices and/or communication modes with a given client, as well maintain a complete record of any and all communications sent by and received from the client. The conversation service 126 can be understood to include at least a conversation module 164 and/or a conversation API 165, as shown in the example embodiment of FIG. 4.

The trace service 127 includes a set of instructions executed by the processor 121 associated with gathering context data from the application or device being used by the client. For example, the trace service 127 can include instructions cause the processor 121 to connect to a web application that is configured to aggregate all trace data associated with a client's application or device. In this manner, the trace service 127 collects the available context data and makes it available for other modules, such as the routing service 124, to use as necessary. The trace service 127 can be understood to include at least a trace API 166 and/or a trace module 167.

Figure 5:
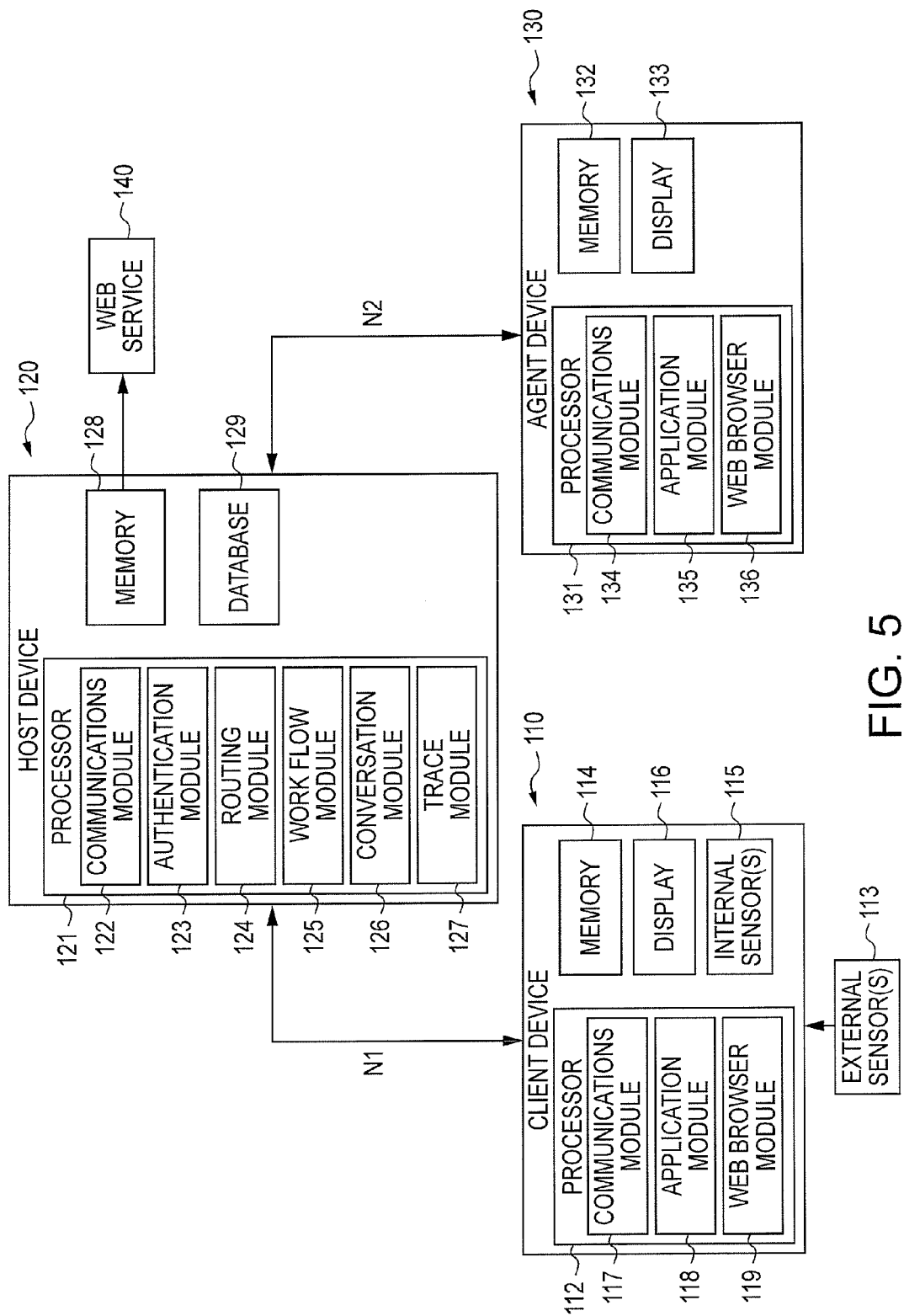
FIG. 5 is a schematic illustration of the host device, a client device, and an agent device interconnected by the communication network, according to an embodiment.

FIG. 5 illustrates an example embodiment of the host device 120 connected to a client device 110 and an agent device 130. Networks N1 and N2 can be the same or different networks as previously described, for example networks N1 and N2 can be a PSTN, a LAN, a WAN, a virtual network, a cellular network, the internet, or the like. The host device 120 in FIG. 5 is substantially the same as described in FIG. 3, but additionally can connect to an optional web service 140 for complementary data processing and functionality. For example, motion data can be captured from local sensors 115 of the client device 110 and sent to the host device 120 and then to web service 140, which can determine the location of the client and the weather at the client location. Client device 110 can include processor 112, memory 114, local sensors 115, and display 116. Additionally, in some embodiments, client device 110 can connect to external sensors 113.

The local sensors 115 can include any of an accelerometer, GPS, microphone, camera, or any other sensors located on the electronic device. External sensors 113 include any sensor that can connect to the electronic device 110 by any means known in the art, including wife, Bluetooth, and Internet of Things (IoT).

Processor 112 of client device 110 can be configured to execute specific modules. The modules can be, for example, hardware modules, software modules stored in the memory 114 and executed in the processor 112, and/or any combination thereof. For example, as shown in FIG. 5, the processor 112 includes and/or executes a communication module 117, an application module 118, and a web browser module 119. The communication module 117 includes a set of instructions executed by the processor 112 associated with communicating with a network N1 and more specifically the host device 120. As described above, the network N1 can be any network such as, for example, a PSTN, a LAN, a WAN, a virtual network, a cellular network, and/or the internet.

The application module 118 includes a set of instructions executed by the processor 112 associated with using a customer service application of the present invention. The application includes a client interface displaying all available options to the client and connects to the host device 120 through network N1 via communication module 117. The client interface allows the client to access the asynchronous conversation routing (ACR) platform 138 and connect to the host device 120 when agent support is desired. The application can be a mobile application, PC application, Mac OS X application, or the like. It should be understood that the client interface can be accessed via the application, or in an alternative embodiment, via a web browser.

The web browser module 119 includes a set of instructions executed by the processor 112 associated with using a web browser. The web browser can be any known web browser, including for example Google Chrome, Microsoft Internet Explorer, Apple Safari, Mozilla Firefox, and any other available browser. The client interface can be accessed by the web browser which allows the client to access the ACR platform 138 and connect to the host device 120 when agent support is desired.

Agent device 130 includes at least a processor 131, a memory 132, and a display 133. The memory 132 can be, for example, a RAM, a memory buffer, a hard drive, a ROM, an EPROM, an EEPROM, or any other suitable electronic storage medium. In some embodiments, the memory 132 of the agent device 130 stores instructions to cause the processor 131 to execute modules, processes, and/or functions associated with using a personal computer application, mobile application, an internet web browser, and/or the like. Furthermore, the memory 132 stores instructions to cause the processor 131 to send signal information to the display 133.

The processor 131 of the agent device 130 can be any suitable processing device configured to run and/or execute a set of instructions or code. For example, the processor can be a general purpose processor, a CPU, an APU, and/or the like. The processor 131 can be configured to run and/or execute a set of instructions or code stored in the memory 132 associated with using a personal computer application, a mobile application, an internet web browser, telephonic or cellular communication, and/or the like. More specifically, in some instances, the processor 131 can execute a set of instructions or code stored in the memory 132 associated with an asynchronous communication with, for example, the host device 120.

The display 133 of the agent device 130 can be any suitable display configured to provide a user interface to the agent device 130. For example, the display 133 can be a CRT monitor, an LCD monitor, an LED monitor, and/or the like. The display 133 can be configured to provide the user interface for a personal computer application, mobile application, internet web browser, and/or the like. In such embodiments, the display 133 can be configured to graphically represent any suitable portion of a customer service system and/or process (e.g., a webpage, contact information, an instant message interface, an e-mail interface, and/or the like). In some embodiments, the display 133 can be and/or include a touch screen.

Processor 131 of the agent device 130 can be configured to execute specific services or modules. The services or modules can be, for example, hardware modules, software modules stored in the memory 132 and executed in the processor 131, and/or any combination thereof. For example, as shown in FIG. 4, the processor 131 includes and/or executes a communications module 134, an application module 135, and a web browser module 136. The communication module 134 includes a set of instructions executed by the processor 131 associated with communicating with a network N2 and more specifically the host device 120. As described above, the network N2 can be any network such as, for example, a PSTN, a LAN, a WAN, a virtual network, a cellular network, and/or the internet.

The application module 135 includes a set of instructions executed by the processor 112 associated with an agent using a customer service application of the present invention. The application includes an agent interface displaying all available options to the agent and connects to the host device 120 through network N1 via communication module 134. The application provides an agent with access to the ACR platform 138.

The web browser module 136 includes a set of instructions executed by the processor 131 associated with using a web browser. The web browser can be any known web browser, including for example Google Chrome, Microsoft Internet Explorer, Apple Safari, Mozilla Firefox, and any other available browser. The agent interface can be accessed by the web browser and allows the agent to access ACR platform 138 and connect to the host device 120 when agent support is desired.

While not shown in FIG. 5, in some embodiments, the client device 110 and agent device 130 can include one or more network interface devices (e.g., a network interface card) configured to connect the client device 110 to the network N1 and the agent device 130 to the network N2. For example, the network interface device can include a Wifi and/or cellular transceiver.

Figure 6:
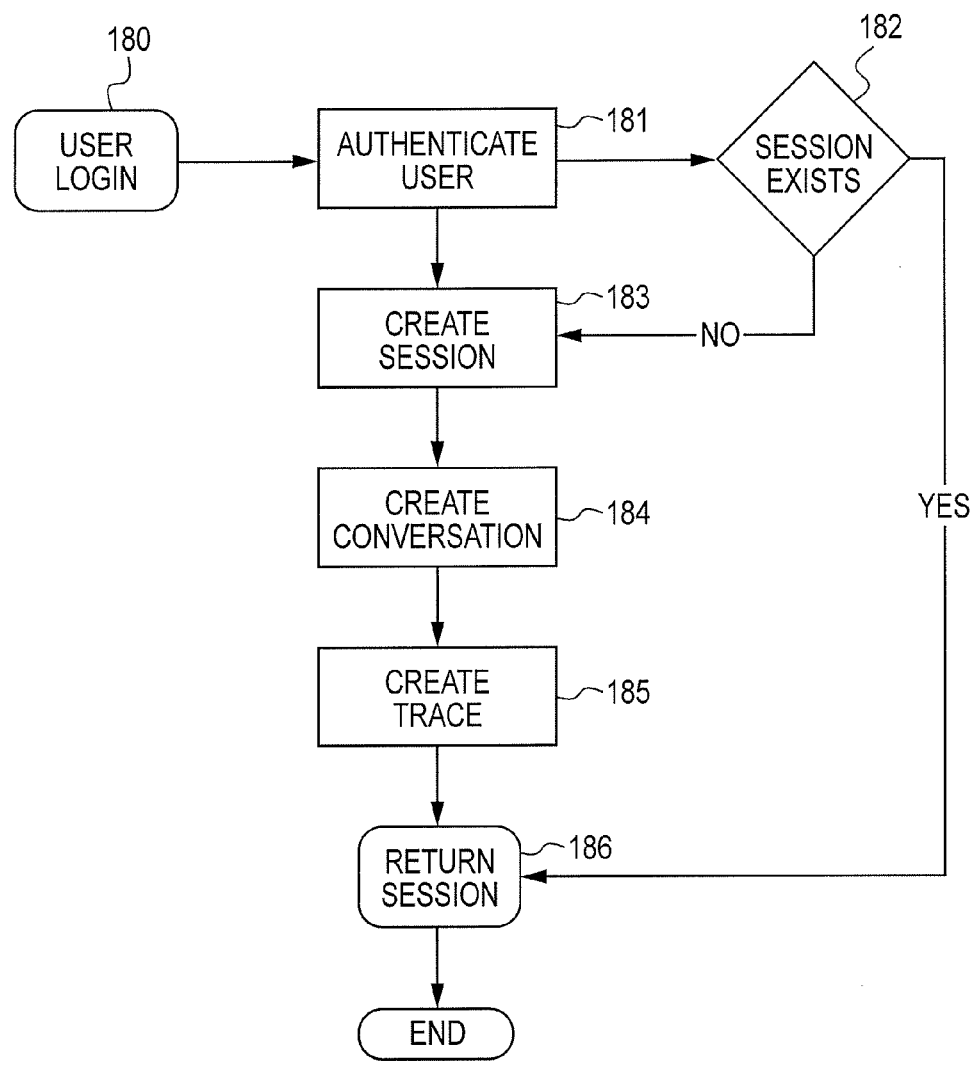
FIG. 6 is a flow diagram depicting an automation phase, according to an embodiment.

In one embodiment, the system and processes of the present invention can be broken up into two stages that are not mutually exclusive: an automation stage, and an engagement stage. The automation stage includes processes occurring prior to a client's request for support from a live agent. As shown in the example embodiment in FIG. 6, the process starts with a client entering the ACR platform 138 via web, mobile, or other electronic device, without any agent intervention. The ACR platform 138 encompasses the aforementioned services executed on the host device 120, application modules 118 and 135 executed on client devices and agent devices, and any web services that may be leveraged to provide additional functionality. The ACR platform 138 is accessed by the client via a client interface that is accessible through a web browser or an application on the client device. The ACR platform 138 is accessed by an agent via an agent interface that is accessible through a web browser or an application on the agent device. The system authenticates 181 the client login and/or client device and then checks to see if a session exists 182. If a session does exist, then the client is returned to the existing session 186. If no session exists, then a new session is created 183. Creating a new session also creates a new session ID. Anything that the user does in the system is governed by the system ID and all subsequent interactions with the platform require a session ID to be sent. If no session ID is sent, or an invalid session ID is sent, then the service will return an error code. Next, a conversation service instance 184 and a trace service instance 185 are created and tied to the session ID. The conversation service instance 184 can have a conversation ID, the trace service instance can have a trace ID, and the client can have a client ID. The session ID can be tied to, or include, all of these IDs. All conversation service data and trace service data subsequently obtained are identified under the session ID. The client now has an active session.

Figure 7:
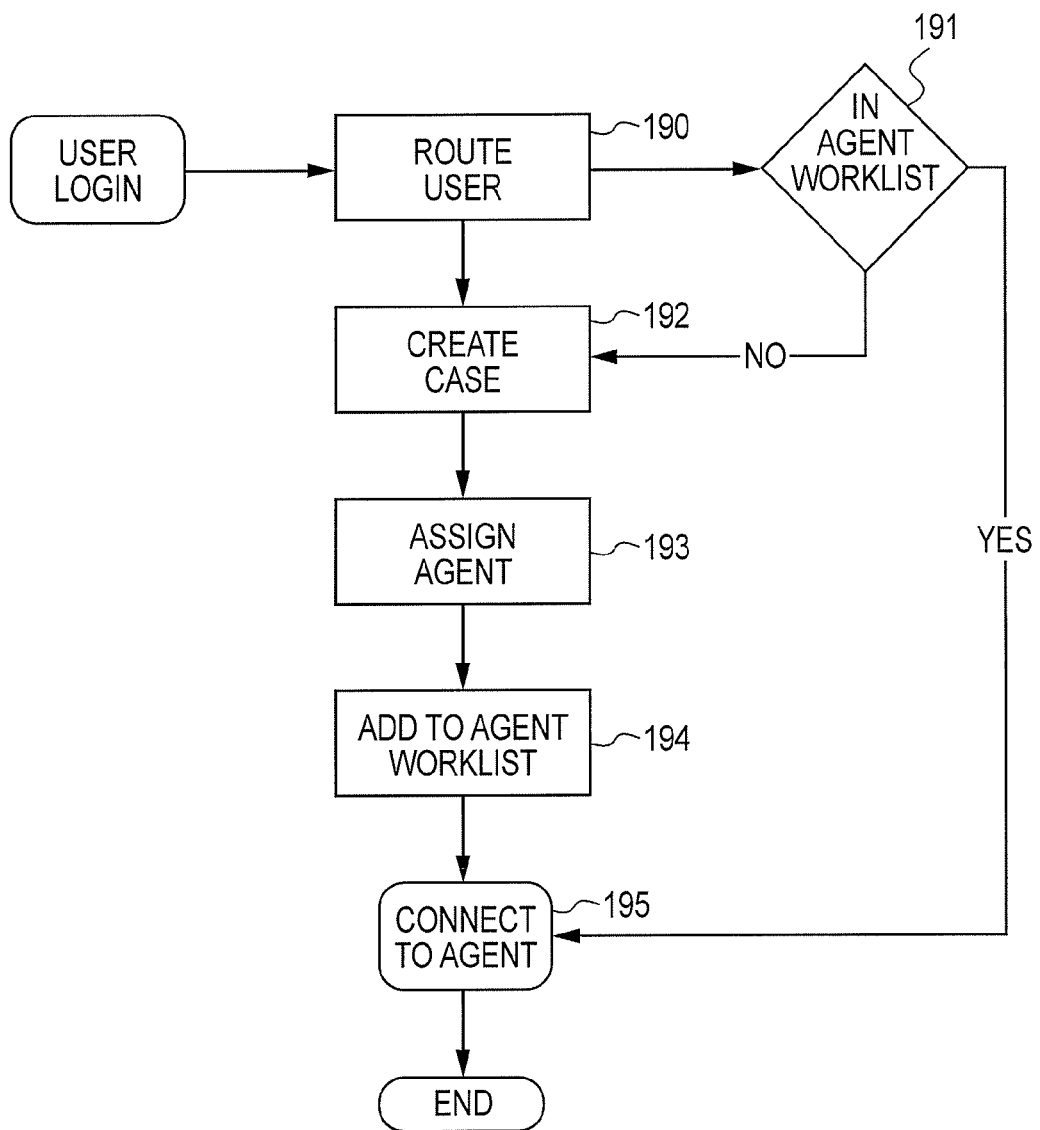
FIG. 7 is a flow diagram depicting an engagement phase, according to an embodiment.

FIG. 7 shows a flow diagram of an example embodiment of an engagement stage. After the system completes the automation stage and the client requests to be connected (route) to an agent 190, the ACR 138 checks to see if the client is already in an agent work list 191. If so, then the client is connected or reconnected to the agent 195. If not, then a client case 192 is created. After the client case 192 is created, the client is assigned (or in some embodiments can pick) an agent 193 and is added to the agent work list 194. Then the client and agent are connected 195. When the client case 192 is created, it is tied to the session ID described above so that the agent has complete access to all of the context data including at least client data, conversation data, and trace data.

Figure 8:
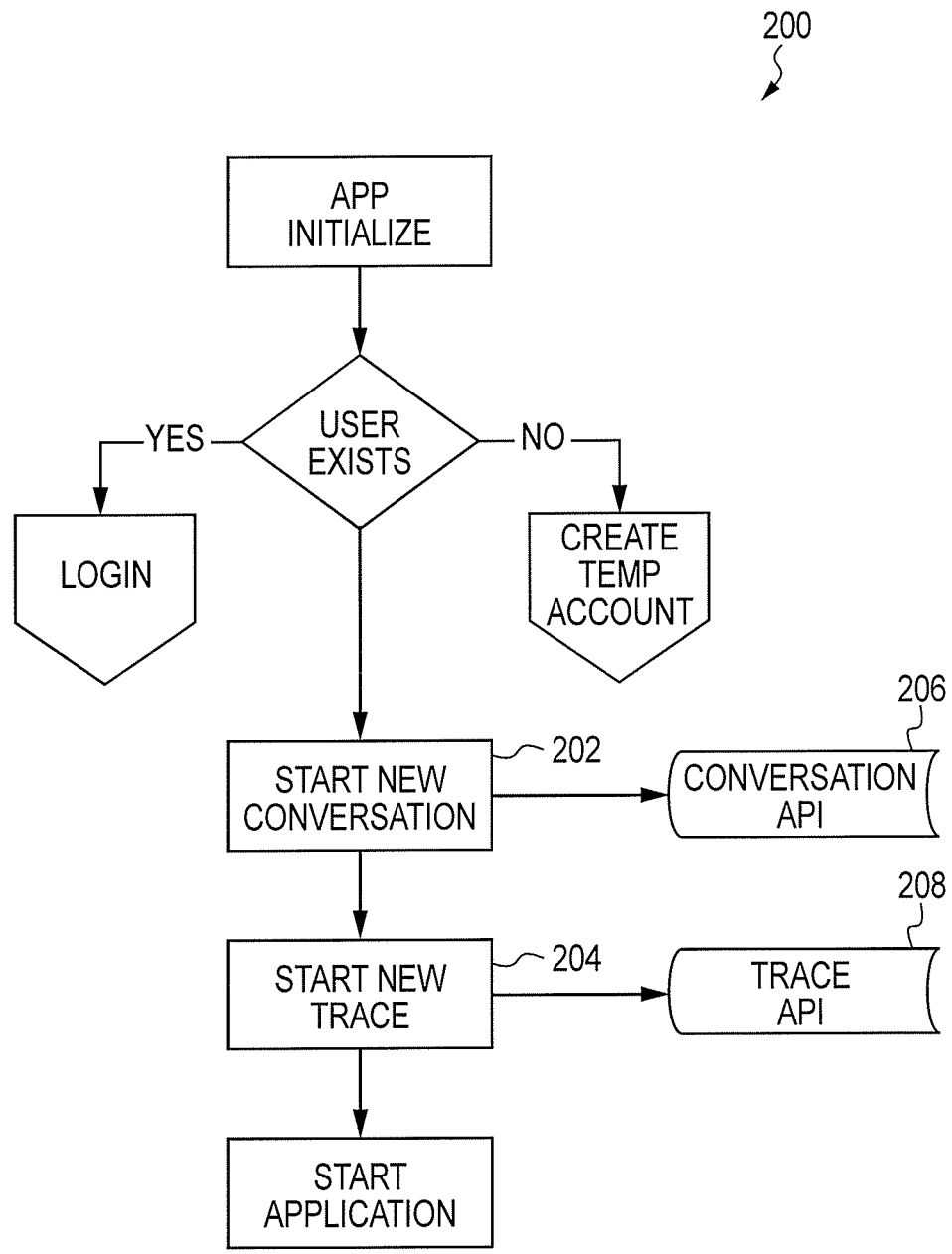
FIG. 8 is a flow diagram depicting the application startup and host start up, according to an embodiment.

FIG. 8 shows a flow diagram of one example embodiment of the application startup 200. After the application initializes, it checks to see if a client exists. If no client exists, a temporary account can be created that can later be converted via a registration process. If a client does exist, a login screen can be displayed. A new conversation service instance 202 is then started, followed by a new trace service instance 204. As described above, the conversation service instance 202 and trace service instance 204 are tied to a session ID that is generated the first time the client enters the platform. The conversation service instance 202 can be created by and communicate with the conversation service API 206 executed by the host device processor 121. The trace service instance can be created by and communicate with the trace service API 208 executed by the host device processor 121. The application then starts.

Figure 9:
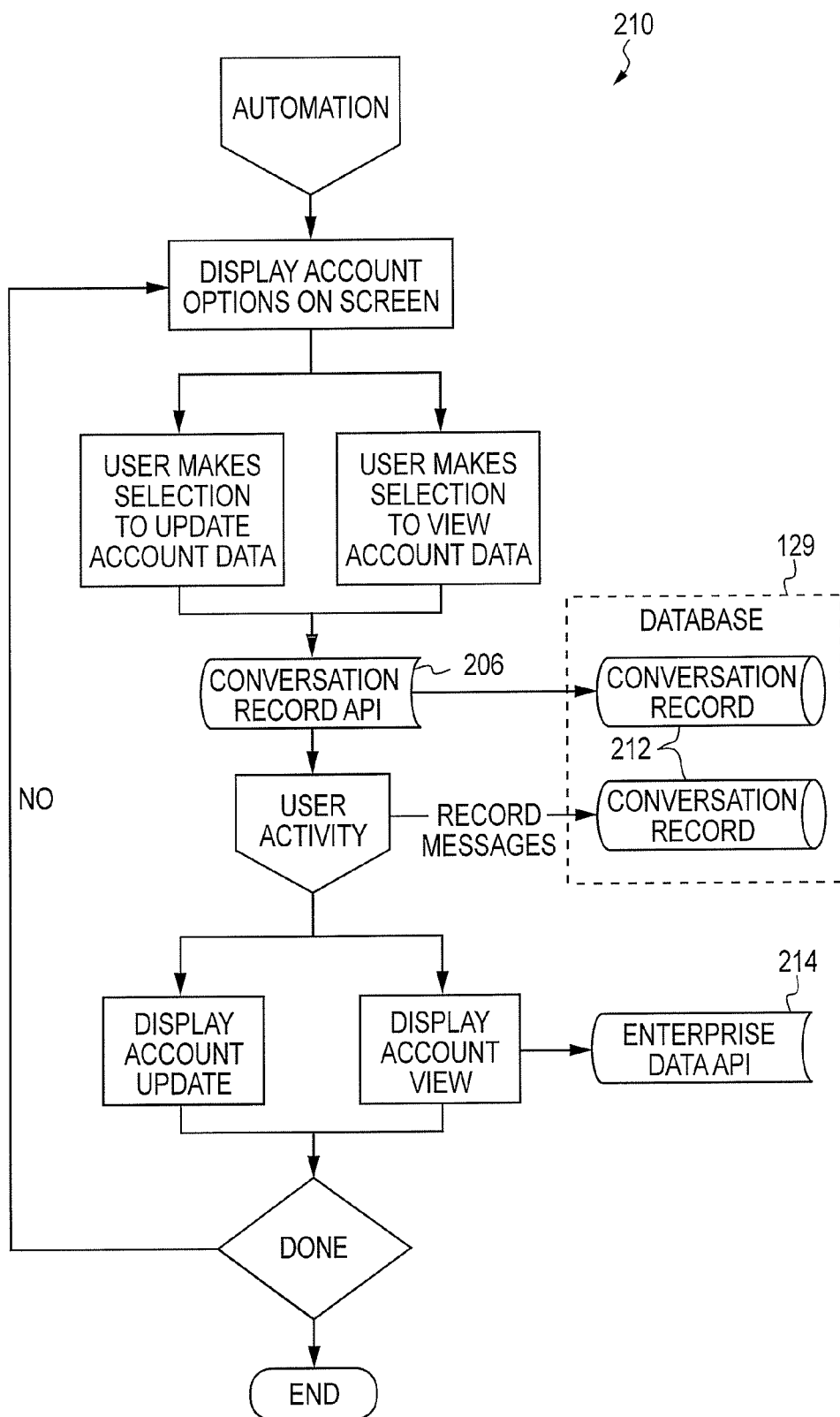
FIG. 9 is a flow diagram depicting conversation recording in an automation phase, according to an embodiment.

FIG. 9 illustrates a flow diagram of an example embodiment of an automation phase 210 beginning with conversation service instance. The ACR platform 138 creates a new conversation service instance for recording all transactions the client makes against an account. This can include retrieval from or changes to the client account, facilitated by the client. The conversation service records the dialog or steps the client goes through while adjusting their account. The conversation service also captures all dialog and transactional messaging that occurs with the application services in use. All information associated with the conversation service instance can be stored in a conversation record in the database 129. In the example embodiment of FIG. 9, after the automation phase starts, the client's account and/or account options are displayed on the screen of the client's device. The client can then make a selection to view the account data or make a selection to update the account data. In this example embodiment, the conversation service API 206 can create a conversation record 212 including any changes made, steps taken, pages viewed, and time spent on each, all stored in the database 129. Any other client activity, for example any messages sent or received by the client, can also be stored in the conversation record 212. The ACR platform 138 then displays the account update or account view, and in one embodiment, some or all of the client account information can be sent to an enterprise data API 214. Another embodiment does not make use of an enterprise data API 214. The steps can be repeated if necessary.

Figure 10:
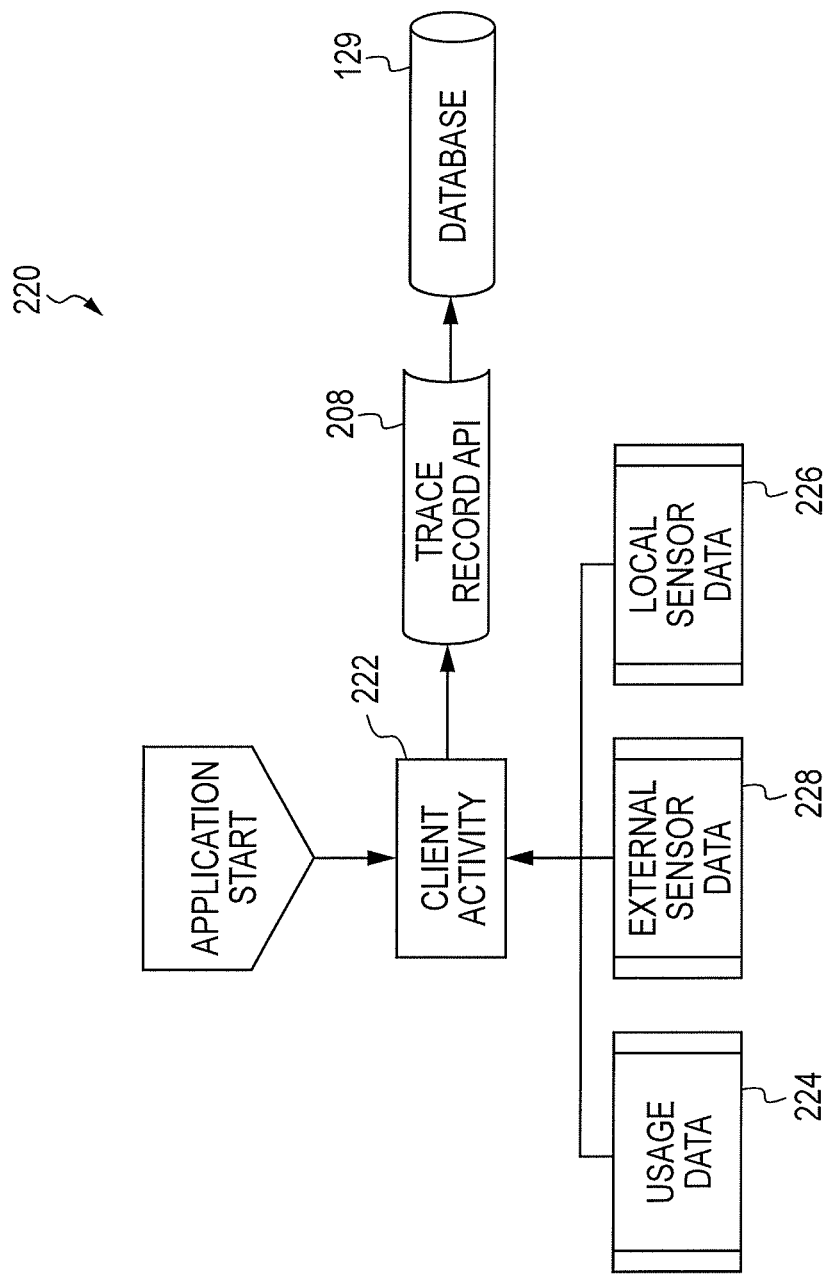
FIG. 10 is a flow diagram depicting the trace service as a client interacts with an application, according to an embodiment.

FIG. 10 is a flow diagram depicting an example embodiment of the trace service 220 as a client interacts with an application. The trace service is responsible for gathering interactions with the application used and any other data around the client that can be tracked, with the goal being to build up context around the client to better pair the client with an agent and to arm the agent with additional context or information to make faster and more informed decisions on behalf of the client. The client activity 222 tracked can be received by the trace service API 208, which then stores the activity in database 129. The trace service API 208 can receive usage data 224 from the application being used by the client, local sensor data 226 on the electronic device 110 being used by the client, and external sensor data 228 that is connected to the electronic device 110 being used by the client. The data can include capturing context from the environment, including web page usage statistics, department, or product the client is browsing (e.g. commerce website), any form data captures (e.g. as the client attempts to book a flight), and images or video captures. Local sensors 115 can include any of an accelerometer, GPS, microphone, camera, or any other sensors located on the electronic device. External sensors 113 include any sensor that can connect to the electronic device 110 by any means known in the art, including wifi, Bluetooth, and Internet of Things (IoT). Data received by the trace service API 208 can be stored in a trace record in database 129.

The automation stage defined above, and in particular the conversation service instance and trace service instance, creates a rich history of the client interaction with the application. The context is actionable by smart algorithms, which can provide smart automation or routing, and is viewable by an agent when and if the client opts for live support.

The engagement stage (second stage) includes activity occurring during and after the transition from the automation stage to a request for live agent support. In one example embodiment, the client makes a direct request for live agent support. In another embodiment, the trace service can make a suggestion for live agent support based on one or more of usage data 224, external sensor data 226, and local sensor data 228 collected by the trace service, and the client can choose to accept or decline the suggestion.

In one example embodiment, the tracing service, after analyzing the context data, determines there is a need to communicate with an agent and prompts the client asking if they would like live support. This prompt can be based on any of the data or context aggregated by the trace service, for example, time spent on a page or on a form, local sensor data, or external sensor data. Alternatively, the client can make a request for live agent support.

Figure 11:
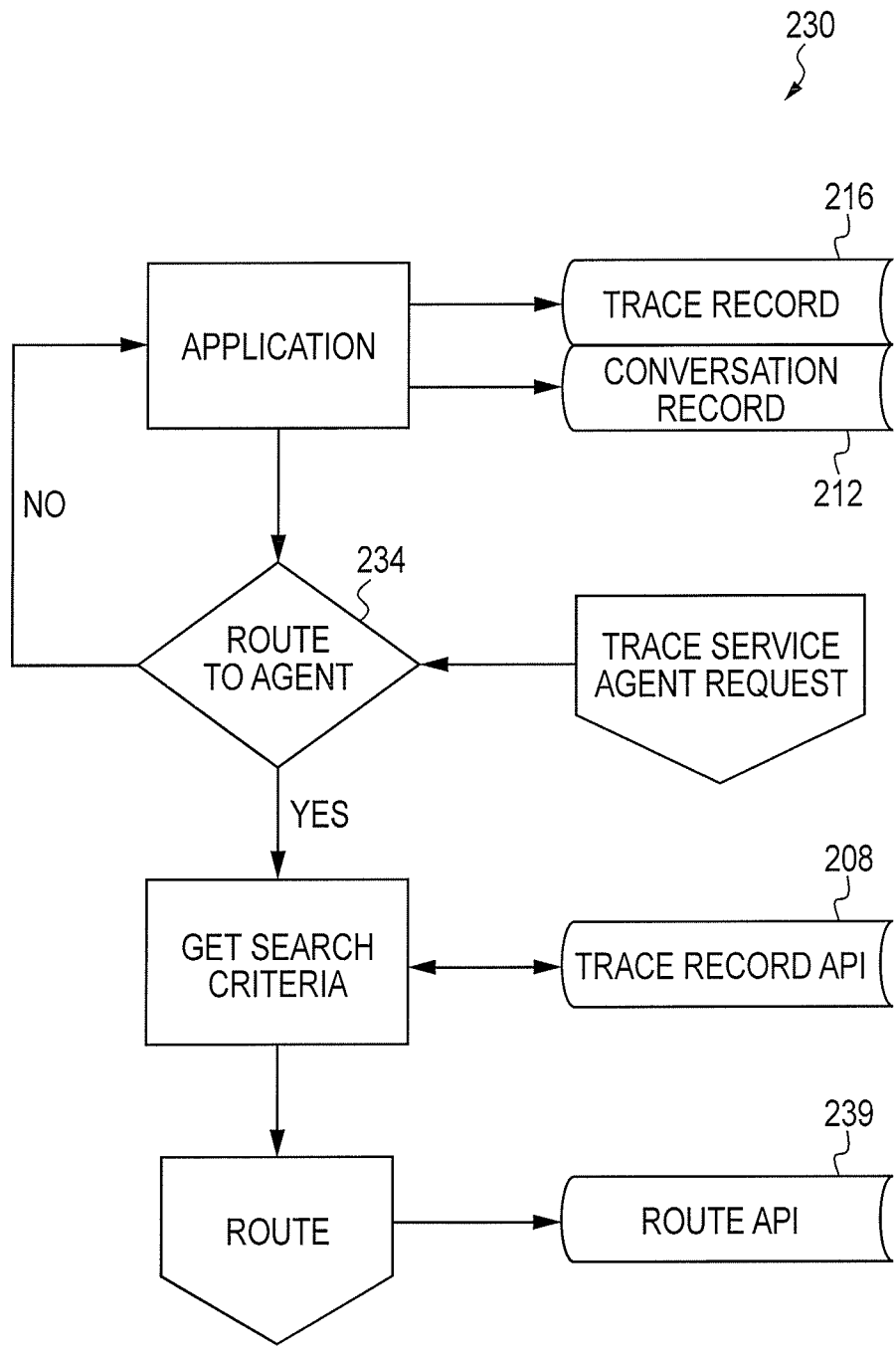
FIG. 11 is a flow diagram depicting a process for invoking agent help, according to an embodiment.

FIG. 11 is a flow diagram showing the process for invoking agent help 230, and is driven by the client opting for help or a message from the trace service suggesting the user might need the support of a live agent (route to agent 234). This request can be the first communication, made at a first time, from the client to the host device 120. However, it is to be understood that the client device 110 can transmit data to the host device 120 prior to the first client communication, for example the conversation data and trace data can be sent to the host device 120 after the client initializes the client interface (via the application or web browser). After the request is made, the ACR 138 retrieves key routing attributes from the trace service API 208. The ACR 138 then executes a routing service, which includes a routing service API 239, to select/route the client to an appropriate agent based on the key routing attributes from the trace service API 208. In another example embodiment (not shown in FIG. 11), the ACR 138 can additionally utilize context data from the conversation service when determining an appropriate agent to route to.

Figure 12:
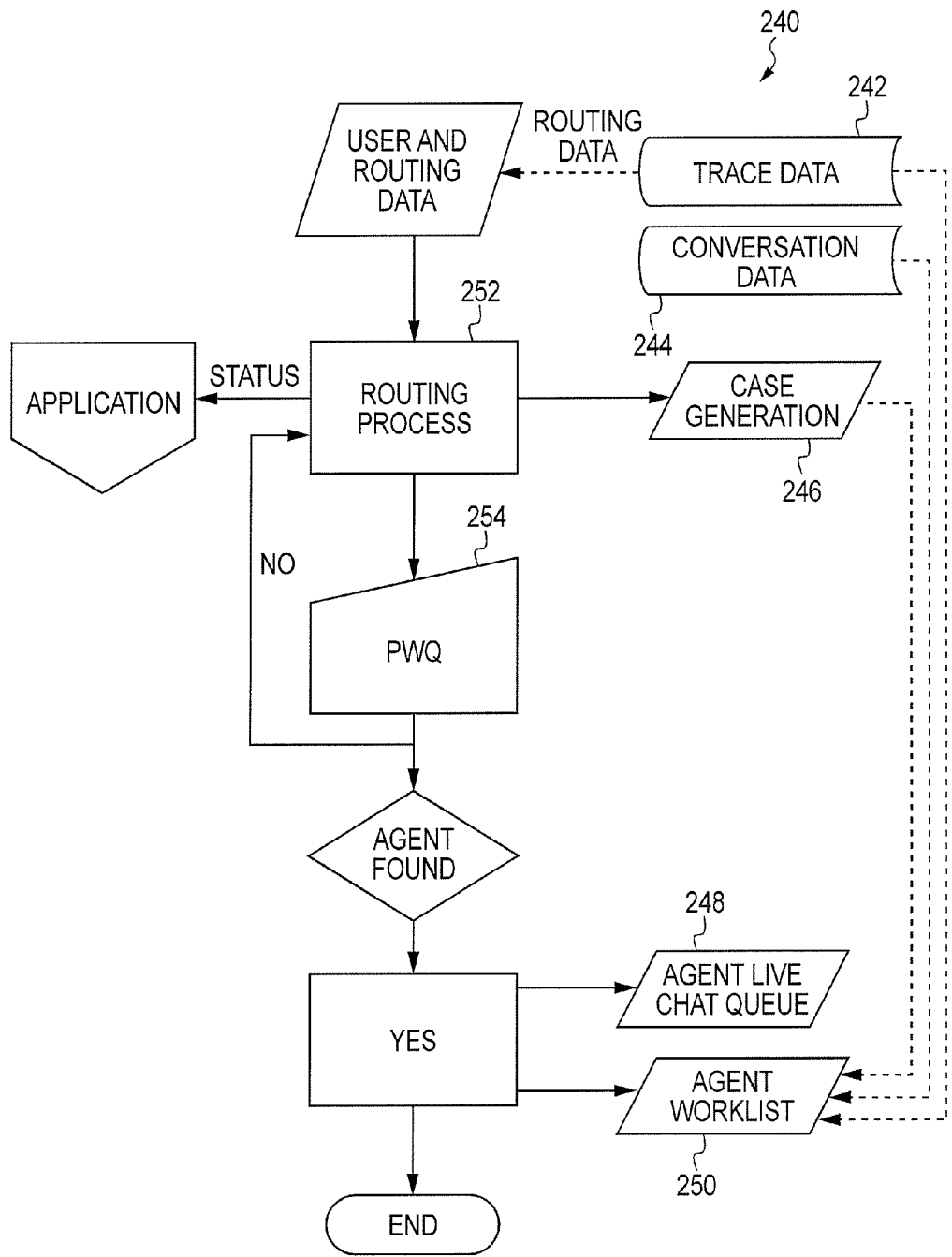
FIG. 12 is a flow diagram depicting an initiation of a live connection to an agent and the placement of the client and client's case in the agent's work list, according to an embodiment.

FIG. 12 is a flow diagram showing an example embodiment of the initiation of a live connection 240 with an agent and the placement of the client and client's case into the agent's work list. The live connection between the client and the agent can represent a second communication made at a second time. A client's case includes all information related to that client and is tied to the session ID, which includes information corresponding to a client ID, conversation ID, and trace ID. The client's case includes any pertinent links to data obtained by the trace service, conversation service, and other case information. In the example shown in FIG. 12, the ACR 138 uses the routing data, which in this embodiment includes trace data 242, to begin the routing process 252. In another example embodiment, the ACR 138 can additionally utilize conversation data 244. The initiation of the routing process 252 can start a case generation service 246, which can provide additional information related to the case to the agent. The previously described session ID is tied to the newly generated client case. The ACR 138 places the client case in a pending work queue (PWQ) 254. If no agent is found, the routing process 252 repeats itself until an agent is found. If an agent is found after the client has been placed in the PWQ 254, then the client and client's case are placed in an agent work list 250 and live chat queue 248, making the agent available for live chat. Trace service data 242, conversation service data 244, and case generation data 246 are all sent to the agent work list 250 by the corresponding services or APIs.

The agent work list 250 organizes and displays all presently open client cases that are assigned to that agent, which includes any corresponding links to the trace service data 242, conversation service data 244, and case generation data 246. The open client cases represent customer service requests made by a client that the agent is working on and that have not yet been resolved. In one example embodiment, an agent work list 250 can be preconfigured to allow up to a certain number of open client cases. For example, the system can be preconfigured to allow up to ten open cases in an agent work list 250. In another embodiment, the agent can configure the maximum number of open cases. In yet another embodiment, there is no maximum number of open cases. In yet another embodiment, the agent can manually choose to not accept new cases.

The agent live chat queue 248 allows the agent to have a live connection with the client. The agent can also have a configurable number of live chat engagements at one time, each with its own lifecycle of connect and reconnects with the client. In one example embodiment, the live chat queue 248 can be preconfigured to allow up to a maximum engagement count, for example, the live chat queue 248 can be preconfigured to allow a maximum engagement count of three live chat channels. In another embodiment, the agent can set the maximum engagement count. In yet another embodiment, the agent can allow the maximum engagement count to be exceeded or reserve a live chat channel for a client even while the live chat queue 248 is at the maximum engagement count. This gives the system flexibility and allows for emergency feedback when or if necessary. If a client requests to connect to the agent in a live chat channel, but the agent does not have a live chat channel open, then the system can present several options, including placing the client in a live chat queue 248, or presenting the client with the option to connect to a new agent.

The agent and client interact within the initiating live chat session that corresponds to a second communication made at a second time. The live chat can include a conversation over the phone, instant messaging, or the like. At the conclusion of the live chat, the client can disconnect while the agent works on the case, or the agent may disconnect from the client, notifying the client that the agent will be working for a resolution and that the client will be notified if new information is required or there is a resolution. This disconnect removes the client from the agent's live chat queue 248, but not the agent's work list 250.

Figure 13:
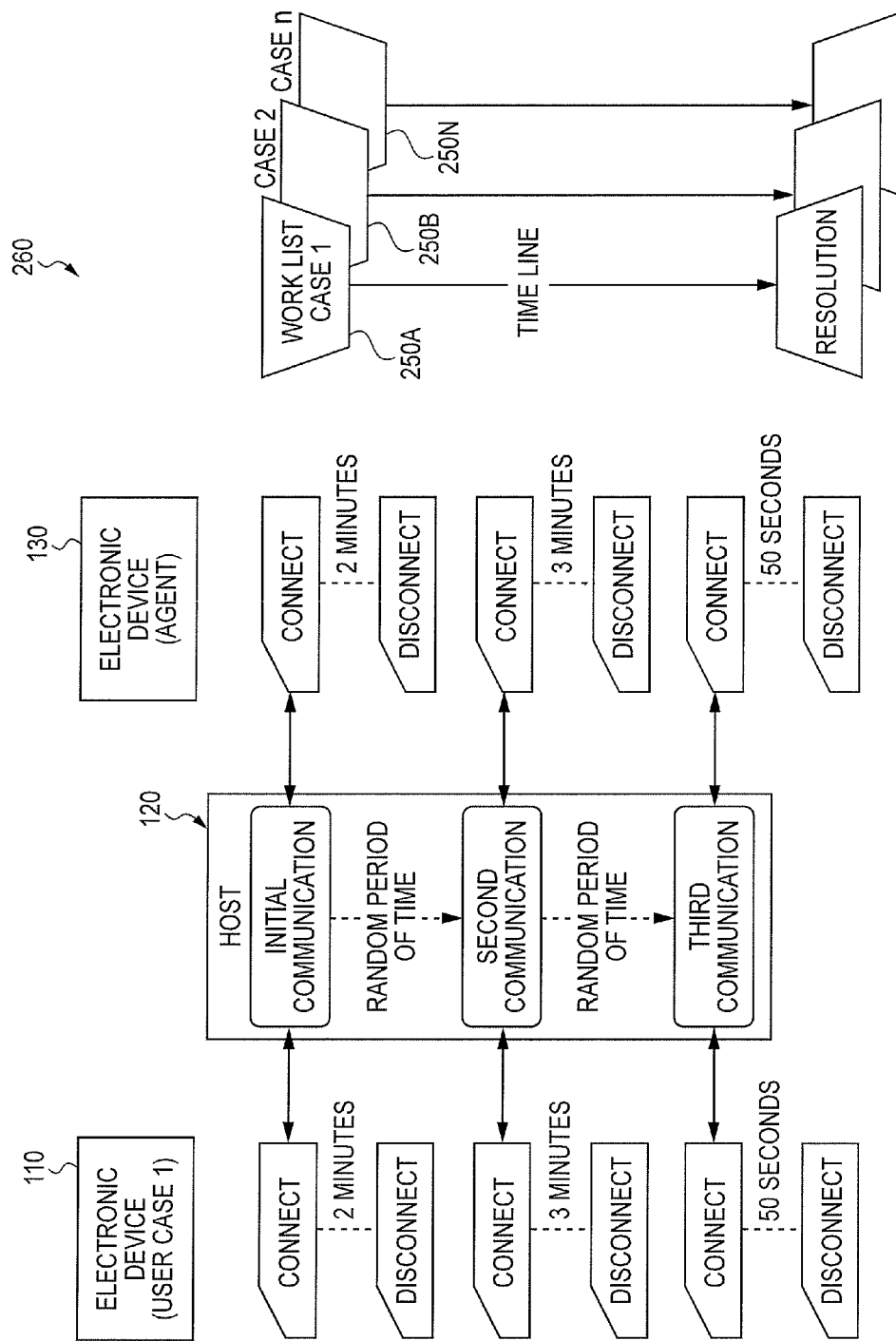
FIG. 13 is a flow diagram depicting the discontinuous communication facilitated between a client and an agent, according to an embodiment.

FIG. 13 depicts the discontinuous (asynchronous) communication facilitated between a client and an agent 260. A first communication at a first time can involve the client requesting live agent support, and a second communication at a second time can include an initial conversation held after the client request for live agent support. After the client makes the request, the system proceeds as described in conjunction with FIGS. 11 and 12. After the initial connection between the client and the agent as depicted in FIG. 12, the work list 250 keeps the case active for the agent. After a random period of time has elapsed, a third communication can occur at a third time. The third communication can be a request to re-engage (and/or actually re-engage) in a live chat, as shown in FIG. 13, or can be an out-of-band communication, which the client or agent can send at any time after the second communication at the second time. If a live connection is re-established, then the client and agent can have a live chat conversation, for example a telephone call or instant messaging. At the conclusion of the conversation, either the client or agent can disconnect from the live connection. After another random period of time has elapsed, a fourth communication can occur at a fourth time. This communication can be an out-of-band communication, which either the client or agent can send at any time, or it can be a request to re-engage (and/or actually re-engage) in a live chat. If a live connection is re-established, then the client and agent can have a live chat conversation, for example a telephone call or instant messaging. At the conclusion of the conversation, either the client or agent can disconnect from the live connection. This sequence can repeat as many times as necessary to reach the resolution of the case, for example a fifth communication at a fifth time, a sixth communication at a sixth time, a seventh communication at a seventh time, and so forth. Each of the communications can be either an out-of-band message, or it can be a request to re-engage in a live chat. Additionally, in a representative embodiment, the agent may be in a live chat/connection with three clients at the same time and have a total of ten cases active in their work list 250 and thus can repeat these steps with any of the clients in their work list 250.

Figure 14:
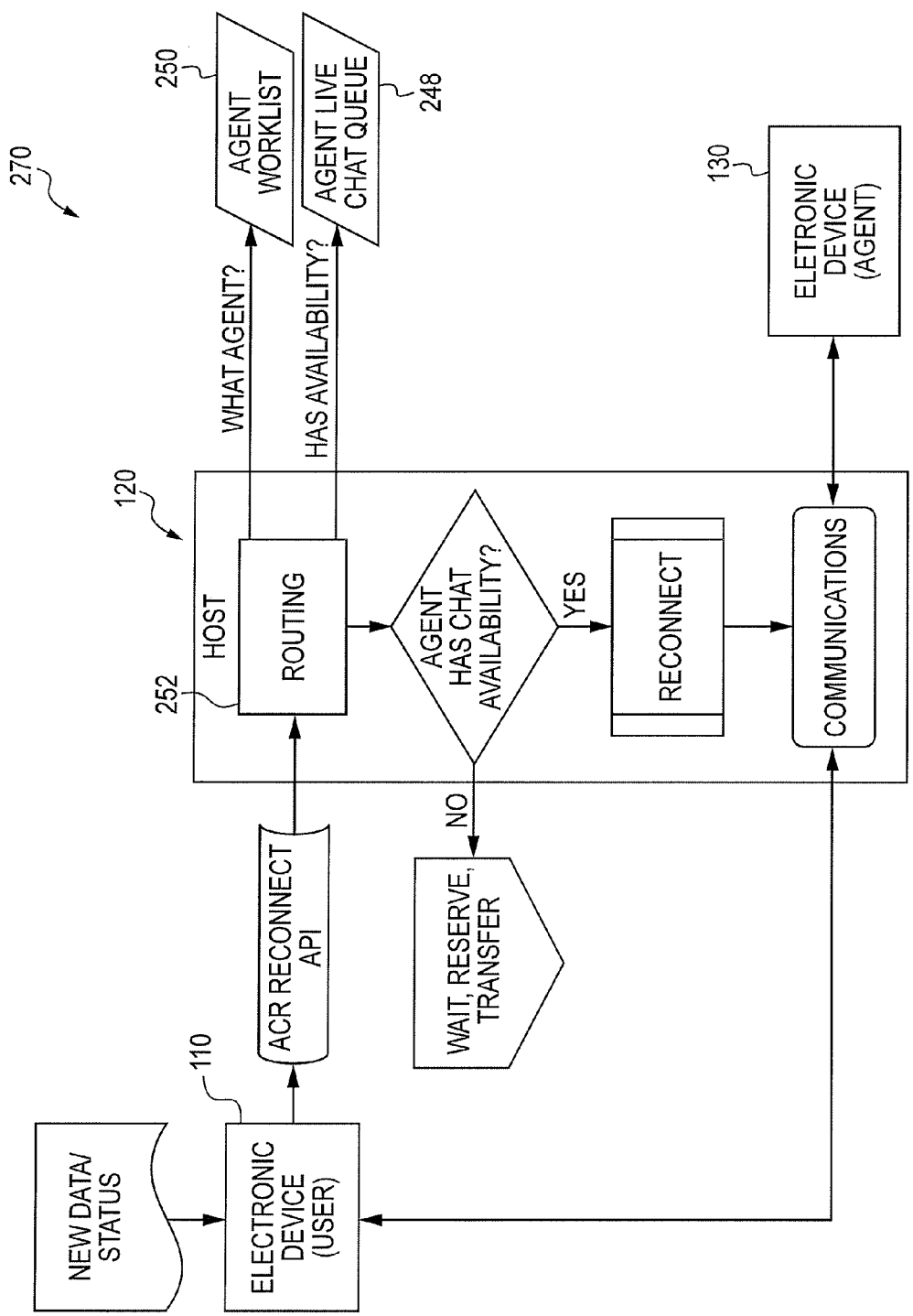
FIG. 14 is a flow diagram depicting a client reconnect process, according to an embodiment.

FIG. 14 a flow diagram depicting an example embodiment of a client reconnect process 270. A client reconnect process 270 can occur after the client and agent have had an initial or first engagement and then disconnected. When a client seeks to reconnect to the agent, two outcomes are possible: 1) the agent is available; or 2) the agent is busy or their live chat queue 248 is full. Ideally, the agent is available and reconnection between the client and the agent is immediate or nearly immediate. In this scenario, the client is placed in the agent's live chat queue 248 and the case/chat resumes. If the agent is busy or their live chat queue 248 is full, the client has two options: 1) the client can request to reserve a connection in the agent's live chat queue 248 when one becomes available (order can be, for example, on a first come, first serve basis), or 2) the client can ask to be transferred to a new agent. If the client asks to be transferred to a new agent, then client and client's case is placed back in the previously described routing process 252 until a new agent is found.

When a new agent is found, the client and client case is placed in the new agent's work list 294 and live chat queue 296. The new agent has access to the conversation history and any other pertinent trace data 242, conversation data 244, and/or case generation data 246 that is available, and communicates with the client. Since the new agent has access to all transactions, conversations, and information that the previous agent had access to, the new agent is able to quickly review the materials and get up to speed on the client's case.

In an alternative embodiment, if the agent live queue 248 is full (agent is at the maximum engagement count), an exception could be made for returning clients, allowing them to connect immediately to the agent and allowing the agent to go over the max simultaneous engagements allowed to the agent. In another alternative embodiment, if the client has supplied additional information for the agent, the client could send to the agent an out-of-band message even if not connected in a live chat. An agent interface asset, for example an information symbol or "i" indicating that new information has been supplied by the client, would trigger the agent's attention to the additional information, allowing the agent to see it and handle it at a later time. Similarly, the agent can send the client an out-of-band message at any time.

Figure 15:
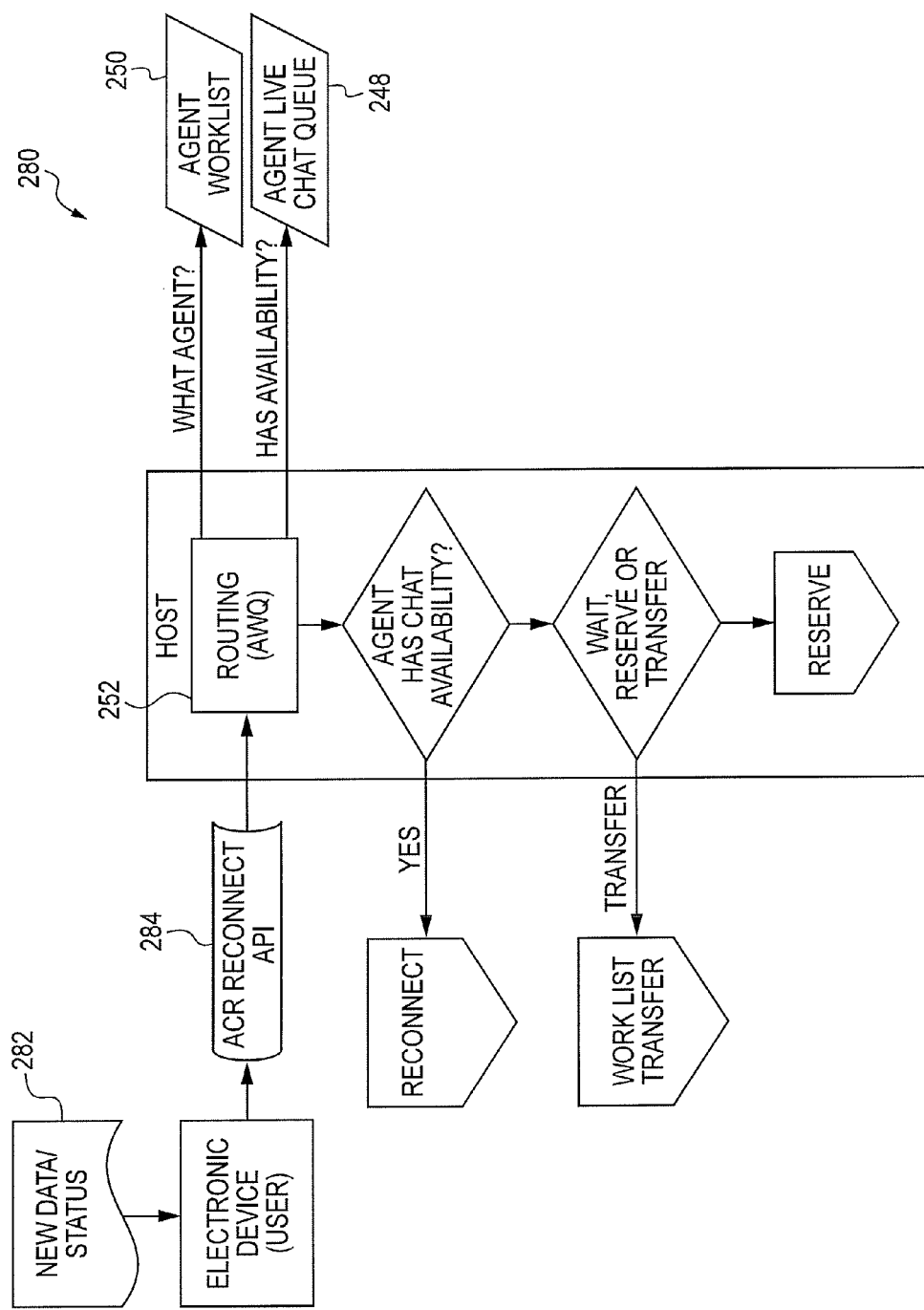
FIG. 15 is a flow diagram depicting a client reconnect process when the agent is unavailable, according to an embodiment.

FIG. 15 is a flow diagram showing an example embodiment where the client requests a reconnect 280. In this case, the client has additional information or wishes to have a status update 282, and requests to reconnect to their agent. A reconnect API 284 (which in one embodiment can be included in the routing service API) can query the routing service 252, which matches the client with their agent, and checks to see if the agent is available. To check to see if the agent is available, the routing service executes an agent work queue (AWQ) module that checks the agent's work list to see if the agent is available for reconnect. If the agent is available, then the client is placed in the agent's live chat queue 248 and reconnection is established. If not, the client can wait, request a transfer to a new agent, or request a reservation of the next available live channel. In another embodiment, the work list transfer could be initiated by the agent if, for example, the agent determines that another agent is better suited to handle the client case.

Figure 16:
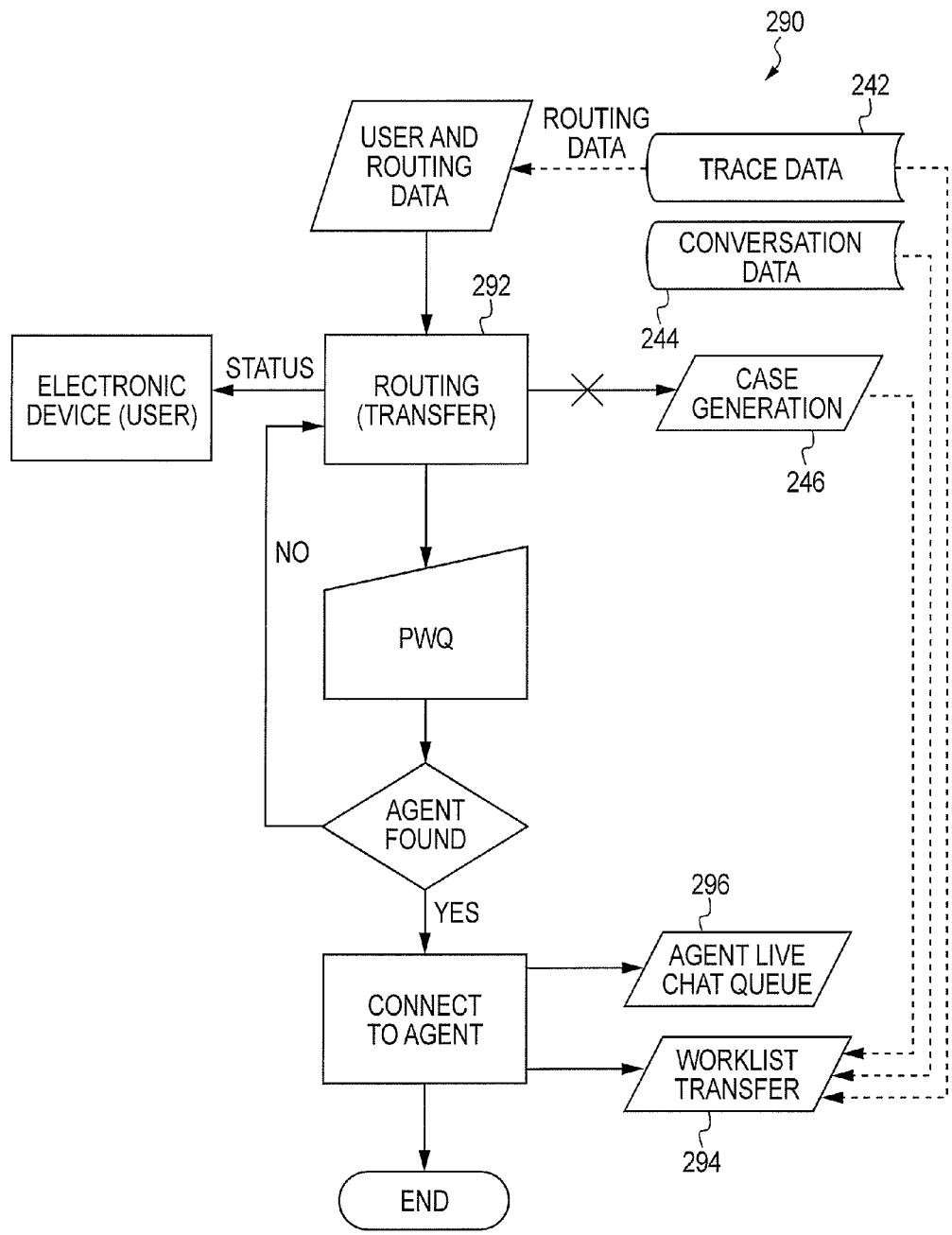
FIG. 16 is a flow diagram depicting a transfer resulting from agent unavailability and a client opting for a transfer, according to an embodiment.

FIG. 16 is a flow diagram depicting an example embodiment of a client transfer 290 where a transfer results from agent unavailability and the client opting for transfer. The client transfer process can be considered a re-routing whereby it is not necessary to create a new case. The routing process 292 is similar to the routing process 252 described in connection with FIG. 12, except that case generation service is not necessary. After a new agent is found using the routing process 292, the client case is transferred to the new agent's work list 294 and the client is placed in the new agent's live chat queue 296.

Figure 17:
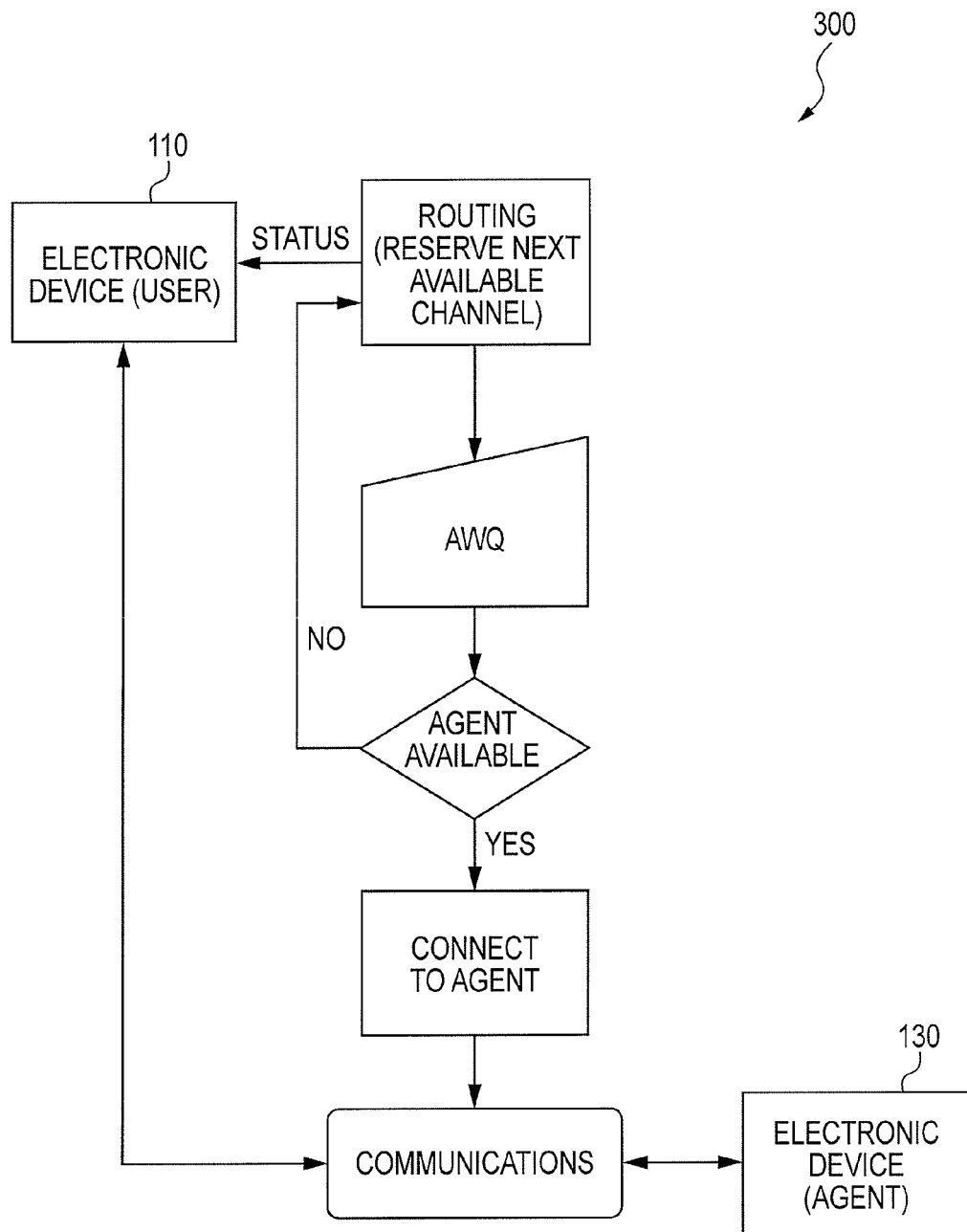
FIG. 17 is a flow diagram depicting a live channel reservation process, according to an embodiment.

FIG. 17 is a flow diagram depicting an example embodiment of a live channel reservation process 300. The live channel reservation process 300 is intended to facilitate channel reservation whereby a client can request the next available live connection to the agent. Reservations are on a first come, first serve bases. The agent can also directly reserve a live channel for a client. The channel is open to the client for a short period of time (ringing period or hold period). If the client connects within the allotted time, the live connection is reestablished and the client will be able to chat with the agent. In one embodiment, this option may only be available to the agent when the live chat queue 248 has less than the max number of live connections. In an alternative embodiment, the agent could initiate a live chat while at max live engagements for emergency feedback.

Figure 18:
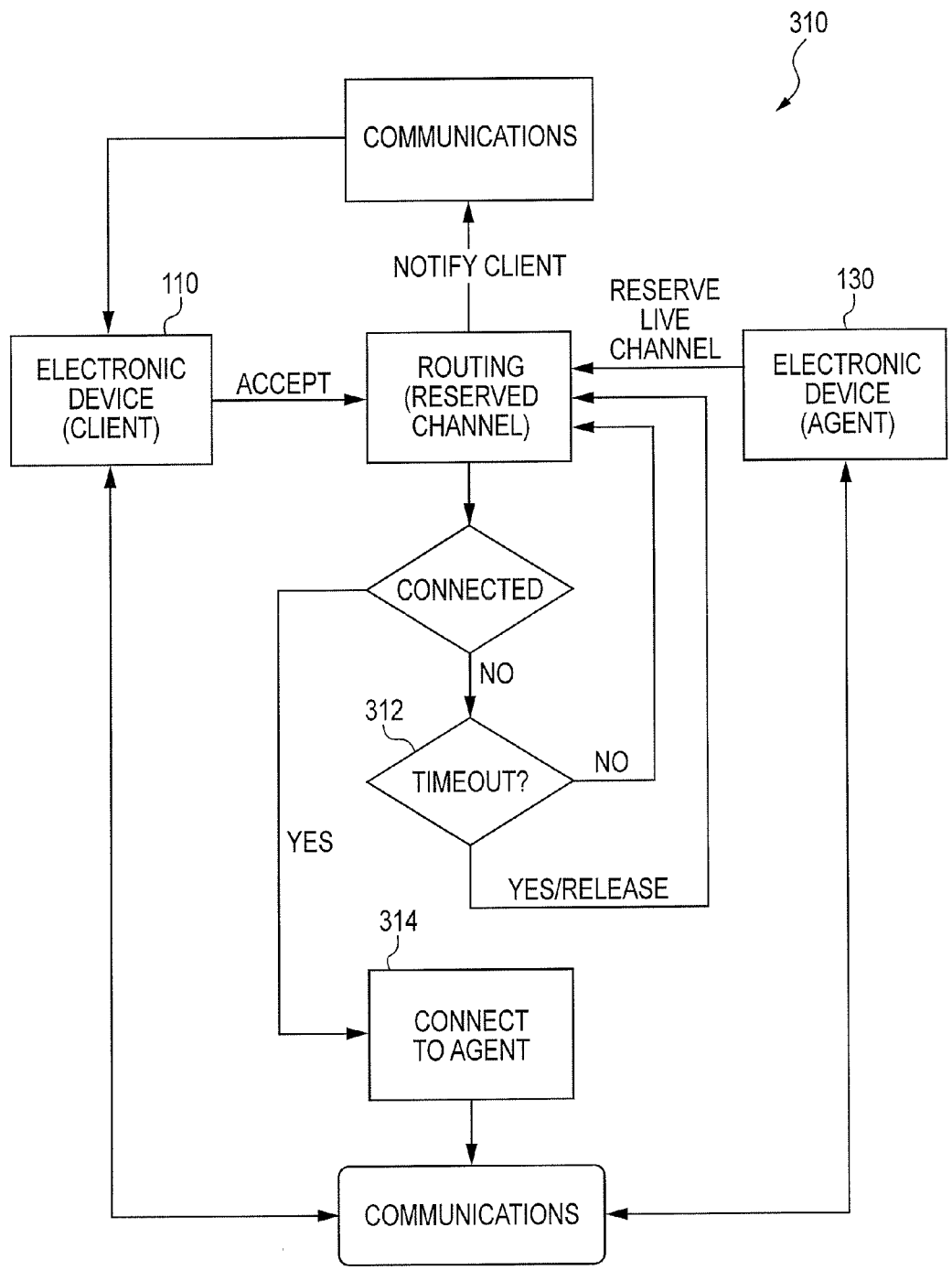
FIG. 18 is a flow diagram depicting a chat channel reservation process, according to an embodiment.

FIG. 18 is a flow diagram of an example embodiment of an agent live chat channel reservation process 310. The agent reserves a channel, and the ACR 138 communicates (via the communication service) to the client that the agent has reserved a live chat channel. Alternatively or additionally, the agent can send the client an out-of-band message via e-mail, SMS, Apple push notification, or the like, with a link provided to re-establish the live connection with the agent. The client can then accept the reservation by clicking the link to reconnect with the agent via a web browser, or the client can re-launch the application and connect to the agent. If the reservation is accepted before a ringing period times out 312, then the client is reconnected to the agent 314. If not, then a communication is sent to the agent, and the client reconnect process as described in conjunction with FIG. 14 is started. In various embodiments, the ringing period can be set for 30 seconds, 1 minute, 2 minutes, 5 minutes, 10 minutes, 15 minutes, or any other appropriate period of time. The period of time can be preconfigured, or configurable by the agent.

In yet another embodiment, the agent live chat channel reservation process 310 can be entirely manual, where the agent reserves the channel, reaches out with a message or notification, and if the client does not respond, the agent manually ends the chat. In this embodiment, there is no ringing period or hold period that can time out. When the agent manually ends the chat, it removes the client from the agent's live chat queue 248.

At any time, the client or agent can send out-of-band messages to each other. In the user interface, out-of-band messages received show up with an "i" or information symbol that indicates to the client or agent that a new message is available. These messages are sent normally while the agent or client is effectively offline and not in a live chat connection. The content of the out-of-band messages can include requests, general information, status messages, or any other relevant information. This allows the engagement to continue, and the client case to progress, without live chat. Out-of-band messages are sent directly to the conversation service.

FIG. 19 is a screen shot of an example embodiment of the ACR, which provides an Agent Desktop 400. At the top of the Agent Desktop, chat bubbles are presented for the clients that are currently in the agent's live chat queue. The chat bubbles are shown in a different color for clients that are connected than for the clients that have a live chat channel reserved but are not presently connected. In one example embodiment, the chat bubble can be green for clients that are presently connected and gray for clients that are not presently connected, however it is to be understood that any color scheme differentiating connected clients from unconnected clients can be used.

Also at the top of the Agent Desktop is a selection menu that allows the agent to select work list mode or available mode. At any time, the agent can set their status in the ACR 138 service to work list mode. In this mode, the agent no longer accepts new cases and is likely handling many cases throughout the lifecycle of engagement with multiple clients. The work list mode allows the agent to focus on their current case load. The work list mode also helps to control the potential for case bloat. If an agent is working on ten cases of varying complexity, switching to work list mode allows them to multitask across only these cases. The work list mode effectively allows the agent to catch up and excludes them from new case routing. Only existing client cases in their work list are allowed to be routed to them on client live chat requests. FIG. 19 shows the agent in work list mode, and thus no new clients will be routed to the agent.

Any number of additional options can be present at the top of the Agent Desktop, including, for example, icons or links for help, home, settings, save progress, exit, transfer, or any other relevant functions.

The Agent Desktop also presents the agent work list, along with various sorting, filtering, and searching options, including options to view all work list items, new work list items, or waiting work list items, as shown in the example embodiment of FIG. 19. The work list can be configured to show various information associated with a client case, including, for example, one or more of the customer, the ticket number, the subject, the status, and the time the case was last updated. The status icons can be presented in different colors according to the status. In one example embodiment, the status icon is blue when the status is "new," and yellow when the status is "waiting." However it is to be understood that any color scheme differentiating the statuses can be used.

Figure 20:
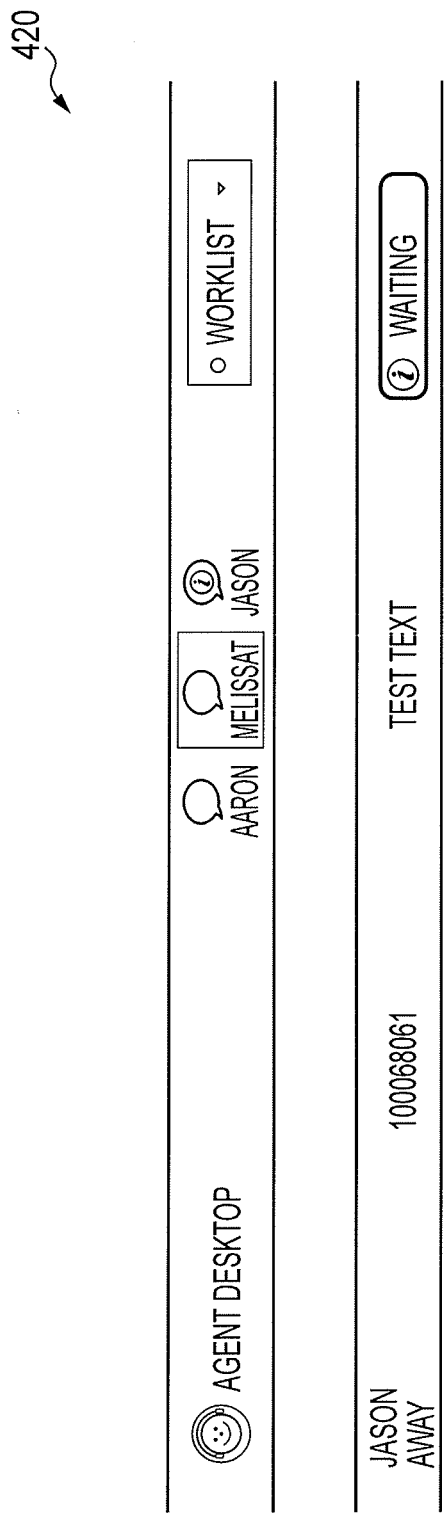

FIG. 20 depicts an example embodiment where a client sends the agent an out-of-band message 420. If the agent has reserved a spot in the live chat queue for the client sending the out-of-band message, then an information ("i") symbol will appear in the chat bubble corresponding to the client that sent the out-of-band message. An information icon will also appear in the status symbol of the client that is displayed in the work list. If there is no live chat channel reserved for the client, then the client will not have a chat bubble at the top of the menu, but the information icon can still be presented in the status icon in the work list. The agent can click on client case or chat bubble and be brought to the case to see the added information.

Figure 21:
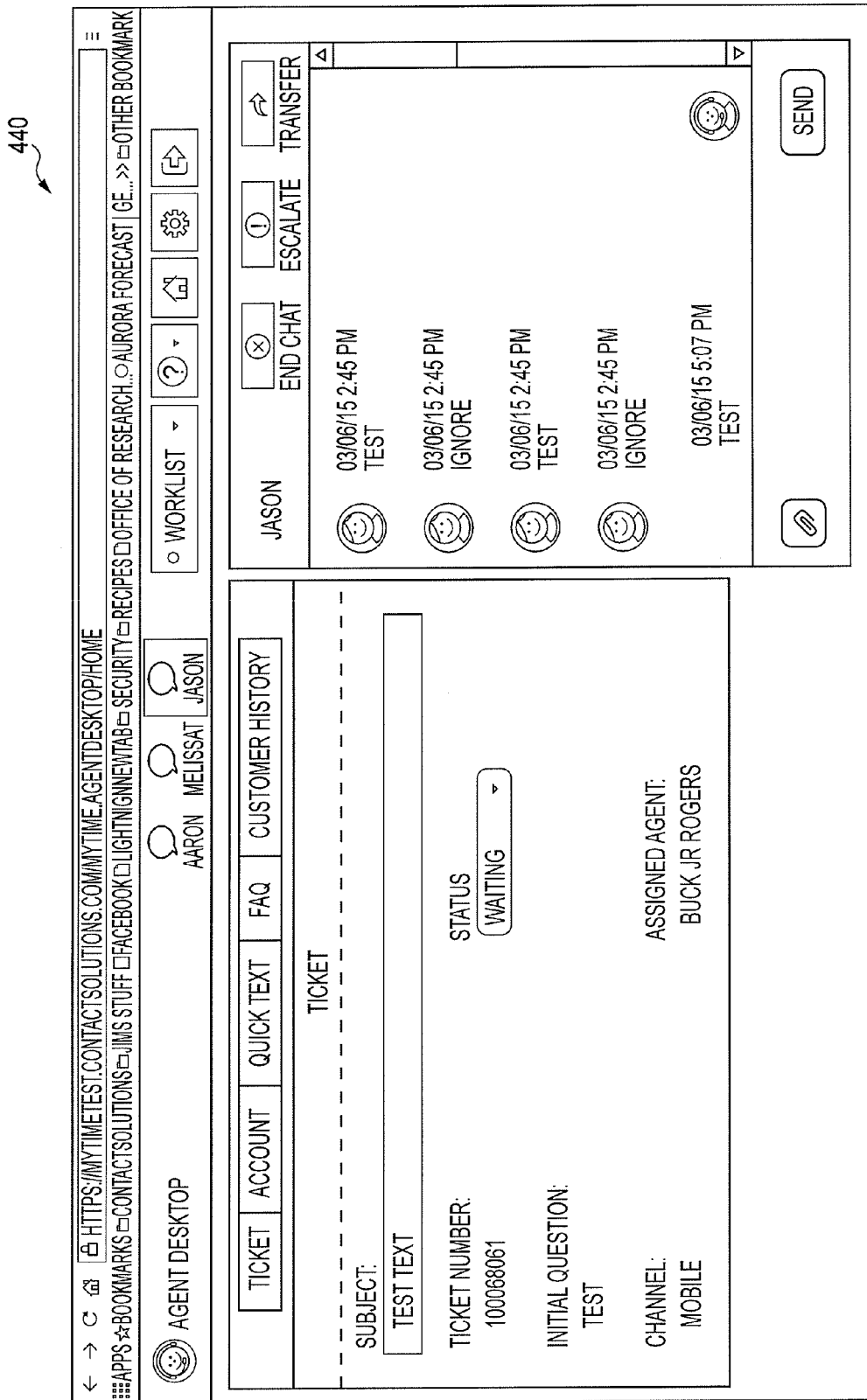

Clicking on the client's chat bubble the client case in the work list takes the agent to the case and engagement screen shown in the example embodiment of FIG. 21. The dialog window on the right shows that client "Jason" has sent the agent a new message. The dialog window can also present the agent with options to end chat, escalate, and transfer. Additionally, the chat field for entering text can also allow for a document to be attached and sent to the client.

FIG. 21 also shows an example embodiment of a client case window 440. Various tabs can be present along the top of the case, including for example one or more of ticket, account, quick text, FAQ, and customer history. FIG. 21 shows the ticket tab selected, which then displays fields for the subject of the ticket, the ticket number, the status, the initial question, the channel, and the assigned agent. The status field can be a drop-down menu that allows the agent to select the status of that ticket. In the example shown in FIG. 21, the status is "waiting," which can mean that the agent is waiting for further correspondence or information from the client.

Figure 22:
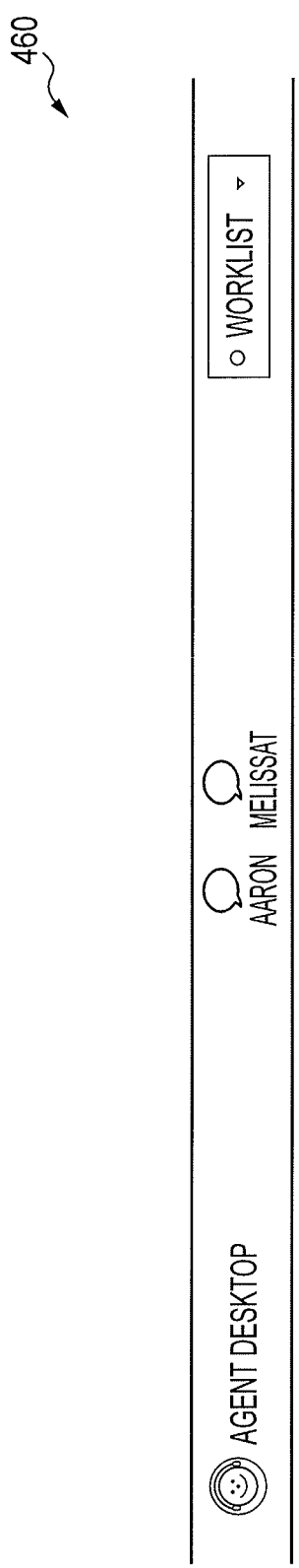
Figure 23:
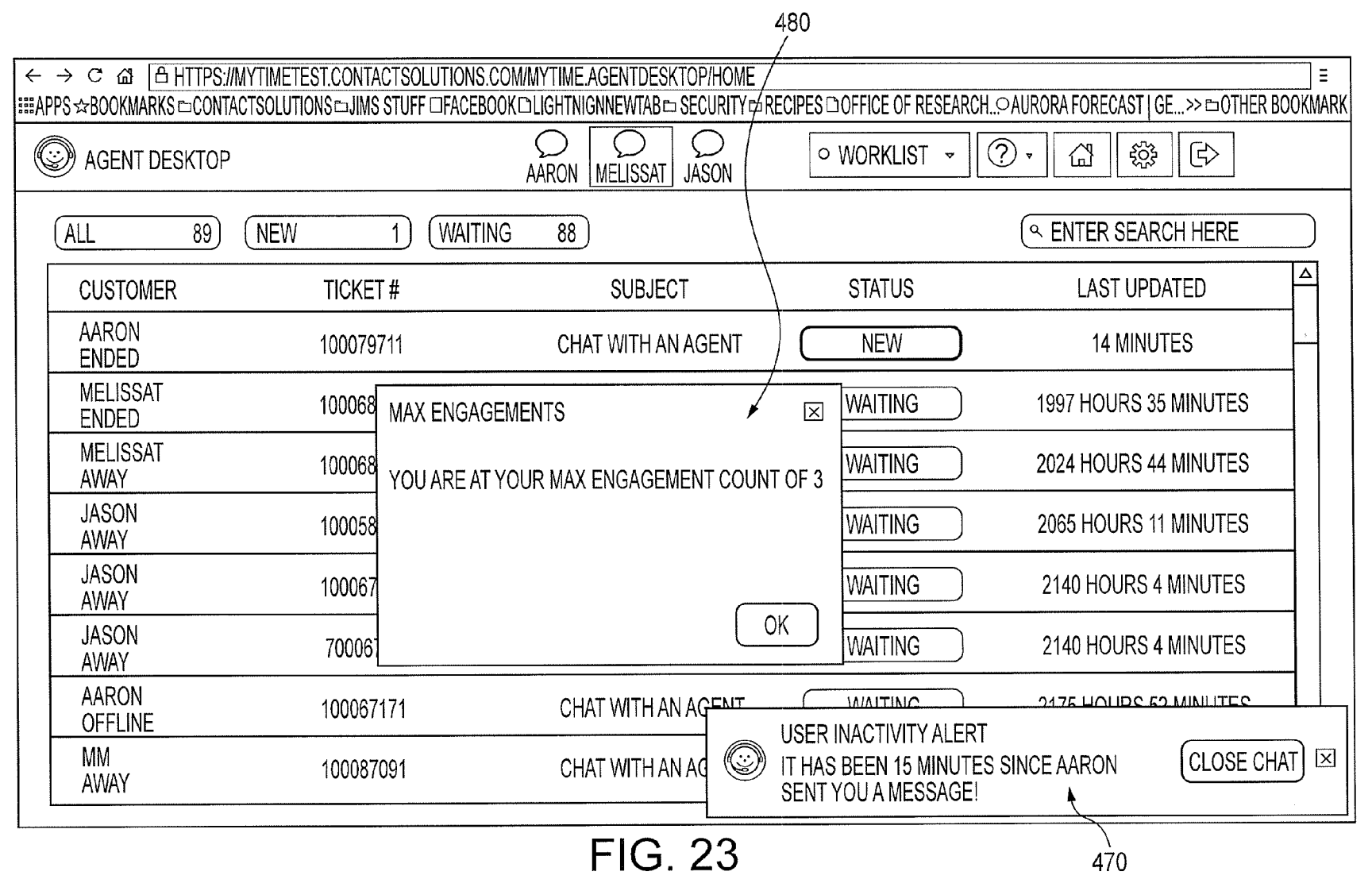

As shown in the example embodiment of FIG. 22, choosing to end the chat with Jason returns the agent to the work list dashboard and removes Jason's chat bubble from the live chat queue 460. FIG. 22 shows two clients in the live chat queue, both of which are currently online. In an example embodiment allowing for a maximum engagement count of three, one more channel is available and thus a returning client wishing to chat with the agent can be connected automatically. Additionally, when one or more channel is available, the agent can select a client case/ticket in the work list dashboard and reserve a live chat channel for that client. This will hold the live chat channel for the client until the system detects inactivity for a pre-set or configurable ringing time or holding time, and suggests to the agent to close the chat. FIG. 23 shows an example embodiment of a client inactivity alert 470. It is understood that the text of the alert is not limited to the specific text shown in FIG. 23, but can be any text that conveys to the agent that the client has been inactive for a certain period of time. In another example embodiment, the agent can reserve a live chat channel for a client even if the agent is already at the maximum engagement count. In yet another example embodiment, the agent can manually reserve a live chat channel and manually close the channel if the client does not reconnect. In this embodiment, there is no ringing period or holding period.

If all available live chat channels are in use, for example three live chat channels are in use or reserved for clients and the maximum engagement count is set for three, then attempting to chat with an additional client will result in the message 480 shown in FIG. 23. It is understood that text of the message is not limited to the specific text shown in FIG. 23, but can be any text that conveys to the agent that the maximum engagements have been reached. In other embodiments, the maximum engagement count can be set for another number, for example two, four, or five. In yet another embodiment, the agent can reserve a live chat channel even while at the maximum engagement count. In yet another embodiment, there is no maximum engagement count.

Figure 24:
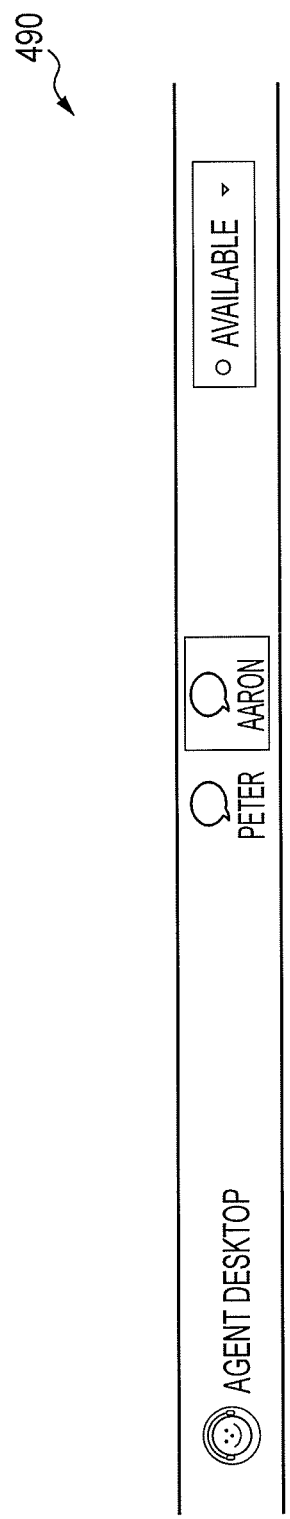

FIG. 24 shows an example embodiment of the work list dashboard when the agent selects "available" mode 490. This setting enables new cases to be added to the agent work list. FIG. 24 also shows only two clients in the live chat queue. In an embodiment with a maximum engagement count of three, a client can request to be reconnected in a live chat and be automatically placed in the live chat queue.

The trace service is used to capture the context of the client. The trace service has a wide range of possible uses and context data that it can collect. In one example embodiment, the trace service is a name-value pair storage service, where the trace service can be used to capture the context of a user while utilizing a commerce application. For example, if the client is browsing in a department on a website, the department identifier is sent to the trace service. Subsequently, if the client is browsing for an appliance (e.g. vacuum cleaner), the product type is also sent to the trace service. The combination of department/product is used to route the client to an agent assigned to that department. As previously defined, the trace service would automatically populate the ACR 138 for agent selection at the initiation of live chat. The data sent to the trace service, and subsequently to be used in the routing process, may look like the following:

```
{
  "trace": [
    {
      "trace": "http://amazon.com/",
      "user_id": "14fc015b-74d0-47f5-8619-93d540683381",
      "user_session": "20380a36-8777-43f7-a79e-65bdb53f4621",
      "department": "home appliance",
      "product": "Dyson model 12345",
      "created_at": "Wed, 08 Apr 2015 19:22:10 +0000",
      "duration": "5 min"
    }
  ]
}
```

The JavaScript Object Notation above is connected to the 'user session' and 'user_ID'. The data contained within defines where the trace was recorded. It defines what department the client is in. It defines the product being viewed. It also contains page usage statistics. In a representative embodiment, duration is how long the client has spent on the product page. The trace service uses this to determine when and if a suggestion should be triggered for live support. The frequency of transmission to the trace service is dependent on the application used. The trace service can communicate with client devices and other sensors through the trace service API. The data acquired by the trace service (via the trace service API) can be stored as a trace record in the database of the host device.

In another representative embodiment, the trace service might also capture a series of process steps in a booking application (i.e. for booking a flight). Each form that is posted from an airline reservation can be sent to the trace service. In a representative example, the base itinerary is captured. In a following step the airline and detailed flight schedule is captured. Each form is captured by the trace service. If at any time the client wishes to speak with an agent, the client can get routed to an appropriate agent based on the trace service data captured, and the data can also be shared with the assigned agent who can then help complete the booking. In an example embodiment, if the client leaves the application and resumes on another device, the data is retrieved and the client can continue where they left off.

In another representative embodiment, the trace service can be used to capture medical and fitness data from devices attached to the electronic devices in use by the client. The explosion of connected consumer and professional grade medical devices represents a significant opportunity for the trace service in the healthcare sector. In a representative embodiment, a client of a medical application could capture a range of health and fitness data that can be utilized by a healthcare coach or medical professional across a range of uses. For example, a mobile application can captures blood pressure and heart rate from a connected device capable of measuring blood pressure and heart rate.

In yet another representative embodiment, the trace service can aggregate context from the various sensors on the electronic device in use by the client, and use a web service to process the data. For example, motion data can be captured from the device and sent to a web service which determines the location of the client and the weather at the client location. Utilizing the environmental context provided by the onboard sensors and web services, the trace service can make suggestions to the client and inform the agent in a live chat of the current environmental conditions in the client location. The context data allows the trace service and agent applications to assess the location and environment the client are in. Geospatial information can be used for a broad set of applications and in general provides intelligence about the human activity on earth when coupled with various web services (e.g. google maps API).

In yet another representative embodiment, the trace service can also consume environment data directly through external personal devices or web service aggregators. Connect Sense Inc. provides such a platform providing a range of environmental sensor including temperature, humidity, water, motion, security, light, and power. Sensors like those found in the Connect Sense suite provide powerful context data around the client's living or industrial work space. In customer support applications, these are valuable for service applications and residential monitoring applications. In one representative embodiment, a temperature sensor that periodically sends data to the trace service could be used to monitor house temperature for elderly citizens. The trace service coupled with communications could trigger a notification to an identified family member or service organization.

Figure 25:
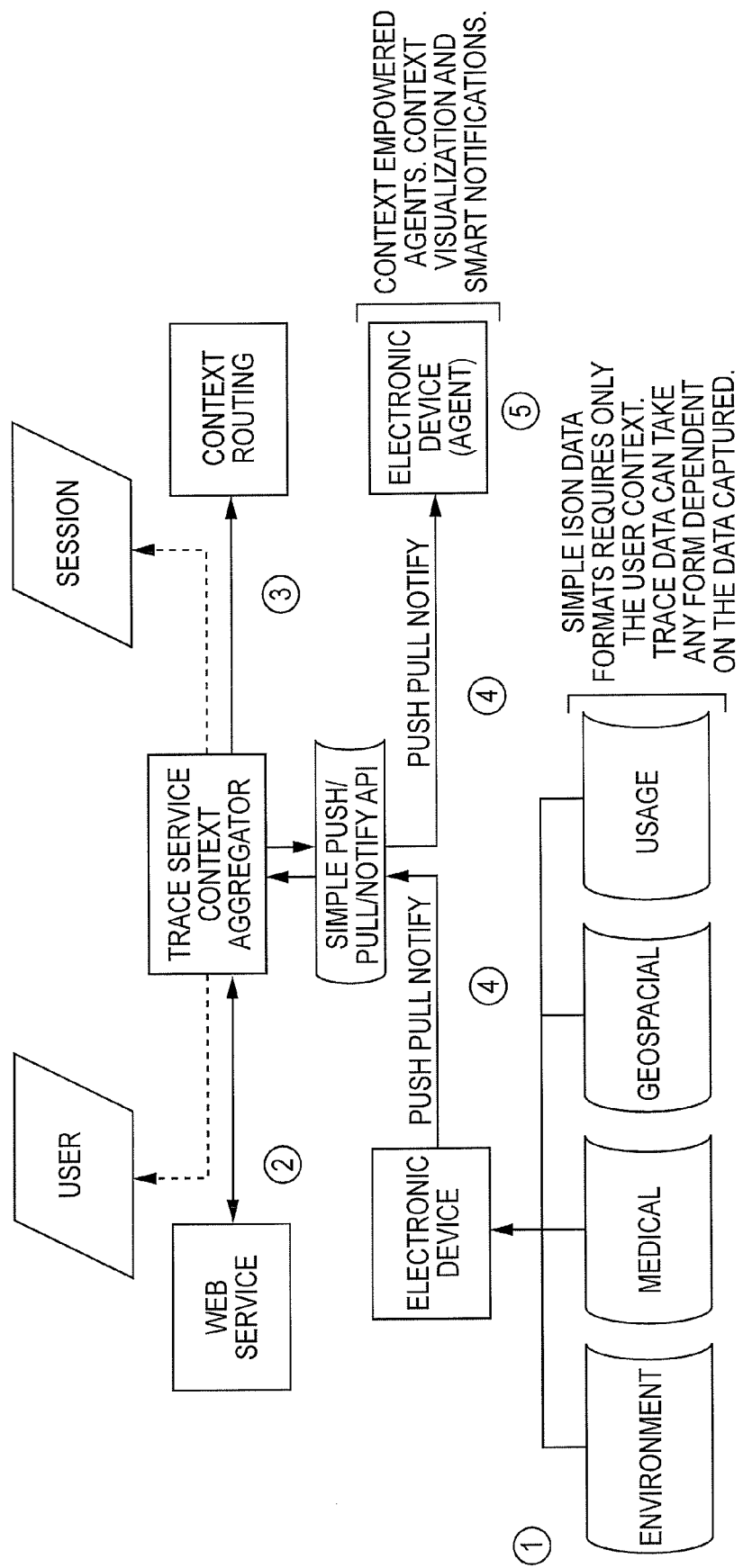
FIG. 25 is a flow diagram depicting the system context for a trace service, according to an embodiment.

FIG. 25 shows a flow diagram of an example embodiment of the trace service. Context data is sourced via the client electronic devices (internal/external sensor) or application usage statistics. Captured context may also be extended by aggregation web services. Usage statistics and other context data can be used to enable smart routing. Aggregate or general context can be used for intelligent notification (threshold rules), or can allow the client to resume, for example during a booking application, at any time on any device. All of the data is tied to a session ID that is unique to the client. Aggregate context is presented to the agent to better support the client across a range of applications, which can include but are not limited to the example embodiments for healthcare, industrial, service, and general consumer/customer services.

It should be known to one of ordinary skill in the art that the above described process embodiments can be implemented on any appropriate system, including the above-described system embodiments. Additionally, in some embodiments, a third party application using an application programming interface (API) can be used by a client to interact with (e.g., view, update, add to, remove from, edit, and/or otherwise communicate with) the host device and/or specific customer service system. For example, a social networking site can use an API to access a portion of a client's information and to present the portion in the social networking site. Such an API provides integration of a customer service into other systems, programs, applications, websites, and/or the like.

What is claimed is:

1. A system for discontinuous communication in a customer service platform, comprising:
   a host device comprising a processor configured to execute at least a conversation service, a trace service, and a routing service, the host device configured to be operatively coupled, via a network, to (1) a client device having a processor configured to execute an application or a web browser having a client interface and (2) an agent device having a processor configured to execute an application or a web browser having an agent interface; and
   a database configured to store a conversation record, a trace record, and a client case,
   the host device configured to receive, via a first communication mode, a first communication including a request for live agent support at a first time from the client device or the agent device,
   the host device configured to receive, via a second communication mode, a second communication from the client device or the agent device, the second communication being received at a second time which is later than and independent of the first time,
   the host device configured to relate the first communication and the second communication to the client case and store the client case in the database,
   wherein the client device and the agent device remain accessible to each other via the client interface and the agent interface,
   wherein before receiving the first communication at the first time, the host device is configured to execute an automation stage that includes checking if a session ID associated with the client device exists, and if no session ID associated with the client device exists then generating a session ID associated with the client device, executing a conversation service that creates a new conversation instance related to the session ID, and executing a trace service that creates a new trace instance related to the session ID,
   wherein in response to the request for live agent support, the host device is configured to execute an engagement stage that includes checking to see if an identifier of the client device is in an agent work list and if not, then creating a client case, linking the session ID to the client case, assigning the client case to an agent, and adding the client case to an agent work list.

2. The system of claim 1, wherein the new conversation instance collects and stores in the database a conversation record comprising all transactions, changes, dialogues, and messages related to the session ID.

3. The system of claim 1, wherein the new trace instance collects and stores in the database a trace record comprising context and environmental data related to the session ID.

4. The system of claim 3, wherein the context and environmental data includes at least one of usage data, local sensor data, and external sensor data.

5. The system of claim 3, wherein the host device routes the client case to the agent by analyzing the trace record in the database and selecting the agent based on the agent's qualifications.

6. The system of claim 5, wherein the host device routes the client case to the agent by additionally analyzing the conversation record.

7. The system of claim 1, wherein the host device is configured to receive a third communication at a third time from the client device or the agent device, the third time being later than and independent from the first time and second time.

8. The system of claim 7, wherein the host device is configured to receive a fourth communication at a fourth time from the client device or the agent device, the fourth time being later than and independent from the first time, the second time, and the third time.

9. The system of claim 7, wherein the third communication is a request to reconnect in a live chat.

10. The system of claim 9, wherein an agent live chat queue is not full and a live connection is reestablished based on the request to reconnect in the live chat.

11. The system of claim 9, wherein when an agent live chat queue is full, the client interface presents options to request a live chat channel reservation, or transfer to a new agent in response to the request to reconnect in the live chat.

12. The system of claim 11, wherein the host device routes the client case to the new agent and places the client case, along with associated data, in the new agent's work list and establishes a live connection between the new agent and the client device through the network.

13. The system of claim 7, wherein the third communication is an out-of-band message.

14. The system to claim 1, wherein the second communication is a live chat.

15. The system of claim 1, wherein the agent interface comprises the agent work list, a live chat queue, and a mode selector, wherein the mode selector includes a work list mode and an available mode.

16. The system of claim 15, wherein the work list mode prevents additional clients from being routed to the agent, and the available mode allows additional clients to be routed to the agent.

17. A discontinuous communication method, comprising:
receiving a request to access a customer service platform from a client interface on a client device including at least a processor, a memory, the client interface, and a display;
executing an automation stage on a host device, the automation stage including at least the steps of: checking if a session identifier (ID) associated with the client device exists, and if no session ID associated with the client device exists then generating the session ID associated with the client device, creating a conversation instance related to the session ID, and creating a trace instance related to the session ID, wherein the host device comprises a memory; a database; and a processor;
receiving at the host device a first communication at a first time comprising a request from the client device for live agent support;
executing an engagement stage on the host device, the engagement stage including checking to see if an identifier of the client device is in an agent work list and if not, then creating a client case, linking the session ID to the client case, assigning the client case to an agent, and adding the client case to an agent work list;
receiving at the host device a second communication at a second time from the client device or an agent device and transmitting the second communication to the other of the client device or the agent device, the second time being later than and independent from the first time; and
associating the first communication and the second communication to the client case.

18. The method according to claim 17, further comprising:
receiving at the host device a third communication at a third time from the client device or the agent device and transmitting the third communication to the other of the client device and the agent device, the third time being later than and independent from the first time and the second time.

19. The method according to claim 18, further comprising:
receiving at the host device a fourth communication at a fourth time from the client device or the agent device and transmitting the fourth communication to the other of the client device and the agent device, the fourth time being later than and independent from the first time and the second time.

* * * * *